(12) United States Patent
Nagaraj et al.

(10) Patent No.: US 11,936,451 B2
(45) Date of Patent: *Mar. 19, 2024

(54) MULTI-BEAMWIDTH RADIO FREQUENCY (RF) BEAMFORMING OPTIMIZATION IN A WIRELESS COMMUNICATIONS APPARATUS, PARTICULARLY FOR A WIRELESS COMMUNICATIONS SYSTEM (WCS)

(71) Applicant: Corning Research & Development Corporation, Corning, NY (US)

(72) Inventors: Shirish Nagaraj, Pleasanton, CA (US); Deepak Pengoria, Milpitas, CA (US); Jiadong Wang, San Diego, CA (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,626

(22) Filed: Jun. 10, 2022

(65) Prior Publication Data

US 2022/0311490 A1    Sep. 29, 2022

Related U.S. Application Data

(63) Continuation of application No. 16/814,390, filed on Mar. 10, 2020, now Pat. No. 11,381,290.

(51) Int. Cl.
*H04B 7/06*     (2006.01)
*H01Q 3/26*     (2006.01)
*H01Q 25/00*    (2006.01)
*H04B 3/52*     (2006.01)
(Continued)

(52) U.S. Cl.
CPC ............ *H04B 7/0617* (2013.01); *H01Q 3/26* (2013.01); *H01Q 25/002* (2013.01); *H04B 3/52* (2013.01); *H04W 16/28* (2013.01); *H04B 7/0842* (2013.01)

(58) Field of Classification Search
None
See application file for complete search history.

(56) References Cited

U.S. PATENT DOCUMENTS

| 9,806,412 B2 | 10/2017 | Deng et al. |
| 2015/0003548 A1 | 1/2015 | Thomas et al. |
| 2016/0248451 A1 | 8/2016 | Weissman et al. |

(Continued)

*Primary Examiner* — Walter J Divito
(74) *Attorney, Agent, or Firm* — William D. Doyle

(57) ABSTRACT

Multi-beamwidth radio frequency (RF) beamforming optimization in a wireless communications apparatus is disclosed. The wireless communications apparatus includes a signal processing circuit configured to process an RF communications signal for radiation in a set of RF beams optimized to maximize coverage in a wireless communications cell. In examples disclosed herein, the set of RF beams includes a center RF beam and a number of edge RF beams. Specifically, the center RF beam is formed with a wider beamwidth to cover a larger center area of the wireless communications cell and, the edge RF beams are each formed with a narrower beamwidth to improve coverage in an edge area of the wireless communications cell. As a result, it may be possible to maximize coverage in the wireless communications cell with fewer RF beams, thus helping to reduce computational complexity, processing latency, and energy consumption of the wireless communications apparatus.

18 Claims, 15 Drawing Sheets

(51) Int. Cl.
  *H04B 7/08*   (2006.01)
  *H04W 16/28*  (2009.01)

(56) References Cited

U.S. PATENT DOCUMENTS

| | | |
|---|---|---|
| 2016/0337916 A1 | 11/2016 | Deenoo et al. |
| 2017/0273058 A1 | 9/2017 | Agiwal et al. |
| 2020/0128455 A1 | 4/2020 | Da et al. |
| 2020/0229117 A1 | 7/2020 | Abedini et al. |
| 2020/0344035 A1 | 10/2020 | Fackler et al. |

MULTI-BEAMWIDTH RADIO FREQUENCY (RF) BEAMFORMING OPTIMIZATION IN A WIRELESS COMMUNICATIONS APPARATUS, PARTICULARLY FOR A WIRELESS COMMUNICATIONS SYSTEM (WCS)

CROSS-REFERENCE TO RELATED APPLICATIONS

This application is a continuation of U.S. patent application Ser. No. 16/814,390, filed Mar. 10, 2020, the content of which is relied upon and incorporated herein by reference in its entirety, and the benefit of priority under 35 U.S.C. § 120 is hereby claimed.

BACKGROUND

The disclosure relates generally to a wireless communications apparatus(es), such as a remote unit(s), a remote radio head(s), or a mobile device(s), particularly in a wireless communications system (WCS), such as a distributed Wireless customers are increasingly demanding wireless communications services, such as cellular communications services and Wireless Fidelity (Wi-Fi) services. Thus, small cells, and more recently Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote antenna units (RAUs) configured to receive and transmit communications signals to client devices within the antenna range of the RAUs. DASs can be particularly useful when deployed inside buildings or other indoor environments where the wireless communications devices may not otherwise be able to effectively receive RF signals from a source.

In this regard, FIG. 1 illustrates a WCS 100, such as a DCS, that is configured to distribute communications services to remote coverage areas 102(1)-102(N), where 'N' is the number of remote coverage areas. The WCS 100 in FIG. 1 is provided in the form of a wireless DCS, such as a DAS 104 as an example. The WCS 100 can be configured to support a variety of communications services that can include cellular communications services, wireless communications services, such as RF identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) connected to a central unit 108 (e.g., a head-end controller, a central unit, or a head-end unit). The central unit 108 can include one or more radios if the WCS 100 is a radio access network (RAN) communications system. Alternatively, the central unit 108 can be communicatively coupled to a source transceiver 110, such as for example, a base transceiver station (BTS) or a baseband unit (BBU). In this example, the central unit 108 receives downlink communications signals 112D from the source transceiver 110 to be distributed to the remote units 106(1)-106(N). The downlink communications signals 112D can include data communications signals and/or communications signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. The remote units 106(1)-106(N) may include RF transmitter/receiver circuits 116(1)-116(N) and antennas 118(1)-118(N), respectively. The antennas 118(1)-118(N) are operably connected to the RF transmitter/receiver circuits 116(1)-116(N) to wirelessly distribute the communications services to user equipment (UE) 120 within the respective remote coverage areas 102(1)-102(N). The remote units 106(1)-106(N) are also configured to receive uplink communications signals 112U from the UE 120 in the respective remote coverage areas 102(1)-102(N) to be distributed to the source transceiver 110.

Conventionally, the remote units 106(1)-106(N) may be configured to communicate the downlink communications signals 112D and uplink communications signals 112U with the UE 120 based on a third-generation (3G) wireless communication technology, such as wideband code-division multiple access (WCDMA), and/or a fourth-generation (4G) wireless communication technology, such as long-term evolution (LTE). As wireless communication technology continues to evolve, a new fifth-generation (5G) new-radio (NR) (5G-NR) wireless communication technology has emerged as a next generation wireless communication technology having the potential of achieving significant improvement in data throughput, coverage range, signal efficiency, and access latency over the existing 3G and 4G wireless communication technologies. As such, it may be necessary to upgrade or reconfigure the remote units 106(1)-106(N) to communicate the downlink communications signals 112D and the uplink communications signals 112U with the UE 120 based on the 5G-NR wireless communication technologies.

The 5G-NR wireless communication technology may be implemented based on a millimeter-wave (mmWave) spectrum that is typically higher than 6 GHz, which makes the downlink communications signals 112D and the uplink communications signals 112U more susceptible to propagation loss. As such, RF beamforming has become a core ingredient of the 5G-NR wireless communication technology to help mitigate signal propagation loss in the mmWave spectrum. In this regard, the antennas 118(1)-118(N) may be replaced by an equal number of antenna arrays (not shown) each including multiple antennas (e.g., 4×4, 8×8, 16×16, etc.). Accordingly, the remote units 106(1)-106(N) may be configured to communicate the downlink communications signals 112D and the uplink communications signals 112U by forming and steering RF beams 122(1)-122(N) toward the UE 120. By forming and steering the RF beams 122(1)-122(N) toward the UE 120, the remote units 106(1)-106(N)

may communicate the downlink communications signals 112D and the uplink communications signals 112U with higher equivalent isotropically radiated power (EIRP) and signal-to-interference-plus-noise ratio (SINR), thus helping to mitigate the propagation loss in the mmWave spectrum.

No admission is made that any reference cited herein constitutes prior art. Applicant expressly reserves the right to challenge the accuracy and pertinency of any cited documents.

SUMMARY

Embodiments disclosed herein include multi-beamwidth radio frequency (RF) beamforming in a wireless communications apparatus, particularly for a wireless communications system (WCS). The wireless communications apparatus includes a signal processing circuit configured to process an RF communications signal for radiation in a set of RF beams optimized to maximize coverage in a wireless communications cell (e.g., an indoor small cell). In examples disclosed herein, the set of RF beams includes a center RF beam and a number of edge RF beams. Specifically, the center RF beam and edge RF beams are formed with different beamwidths. The center RF beam is formed with a wider beamwidth to cover a larger center area (e.g., near the antenna array) of the wireless communications cell, and the edge RF beams are each formed with a narrower beamwidth to improve coverage in an edge area (e.g., away from the antenna array) of the wireless communications cell. By forming the wider center RF beam to cover the larger center area, it may be possible to maximize coverage in the wireless communications cell with fewer RF beams, thus helping to reduce computational complexity, processing latency, and energy consumption of the wireless communications apparatus.

One exemplary embodiment of the disclosure relates to a wireless communications apparatus. The wireless communications apparatus includes a signal processing circuit configured to generate a plurality of weighted RF communications signals. The wireless communications apparatus also includes at least one antenna array comprising a plurality of radiating elements coupled to the signal processing circuit and each configured to radiate a respective one of the plurality of weighted RF communications signals. The wireless communications apparatus also includes a control circuit. The control circuit is configured to determine a center beam weight set comprising a plurality of center beam weights each corresponding to a respective one of the plurality of radiating elements. The control circuit is also configured to control the signal processing circuit to generate the plurality of weighted RF communications signals based on the center beam weight set to cause the at least one antenna array to radiate a center RF beam comprising the plurality of weighted RF communications signals and associated with a center beamwidth. The control circuit is also configured to determine a plurality of edge beam weight sets each comprising a plurality of edge beam weights that each correspond to a respective one of the plurality of radiating elements, respectively. The control circuit is also configured to control the signal processing circuit to generate the plurality of weighted RF communications signals based on each of the plurality of edge beam weight sets to cause the at least one antenna array to radiate a plurality of edge RF beams each comprising the plurality of weighted RF communications signals and associated with an edge beamwidth narrower than the center beamwidth.

An additional exemplary embodiment of the disclosure relates to a method for optimizing RF beamforming in a wireless communications apparatus. The method includes determining a center beam weight set comprising a plurality of center beam weights. The method also includes generating a plurality of weighted RF communications signals based on the center beam weight set to cause a center RF beam comprising the plurality of weighted RF communications signals and associated with a center beamwidth to be radiated. The method also includes determining a plurality of edge beam weight sets each comprising a plurality of edge beam weights. The method also includes generating the plurality of weighted RF communications signals based on each of the plurality of edge beam weight sets to cause a plurality of edge RF beams each comprising the plurality of weighted RF communications signals and associated with an edge beamwidth narrower than the center beamwidth to be radiated.

An additional exemplary embodiment of the disclosure relates to a WCS. The WCS includes a central unit. The WCS also includes a plurality of remote units coupled to the central unit via a plurality of communications mediums. The plurality of remote units is configured to receive a plurality of downlink digital communications signals from the central unit via the plurality of communications mediums, respectively. The plurality of remote units is also configured to convert the plurality of downlink digital communications signals into a plurality of downlink RF communications signals, respectively. The plurality of remote units is also configured to distribute the plurality of downlink RF communications signals, respectively. The plurality of remote units is also configured to receive a plurality of uplink RF communications signals, respectively. The plurality of remote units is also configured to convert the plurality of uplink RF communications signals into a plurality of uplink digital communications signals, respectively. The plurality of remote units is also configured to provide the plurality of uplink digital communications signals to the central unit via the plurality of communications mediums, respectively. At least one remote unit among the plurality of remote units includes a signal processing circuit configured to generate a plurality of weighted RF communications signals corresponding to at least one of the plurality of downlink RF communications signals. The at least one remote unit also includes at least one antenna array comprising a plurality of radiating elements coupled to the signal processing circuit and each configured to radiate a respective one of the plurality of weighted RF communications signals. The at least one remote unit also includes a control circuit. The control circuit is configured to determine a center beam weight set comprising a plurality of center beam weights each corresponding to a respective one of the plurality of radiating elements. The control circuit is also configured to control the signal processing circuit to generate the plurality of weighted RF communications signals based on the center beam weight set to cause the at least one antenna array to radiate a center RF beam comprising the plurality of weighted RF communications signals and associated with a center beamwidth. The control circuit is also configured to determine a plurality of edge beam weight sets each comprising a plurality of edge beam weights that each correspond to a respective one of the plurality of radiating elements. The control circuit is also configured to control the signal processing circuit to generate the plurality of weighted RF communications signals based on each of the plurality of edge beam weight sets to cause the at least one antenna array to radiate a plurality of edge RF beams each comprising the plurality of weighted RF communications signals and associated with an edge beamwidth narrower than the center beamwidth.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include multi-beamwidth radio frequency (RF) beamforming in a wireless communications apparatus, particularly for a wireless communications system (WCS). The wireless communications apparatus includes a signal processing circuit configured to process an RF communications signal for radiation in a set of RF beams optimized to maximize coverage in a wireless communications cell (e.g., an indoor small cell). In examples disclosed herein, the set of RF beams includes a center RF beam and a number of edge RF beams. Specifically, the center RF beam and edge RF beams are formed with different beamwidths. The center RF beam is formed with a wider beamwidth to cover a larger center area (e.g., near the antenna array) of the wireless communications cell and the edge RF beams are each formed with a narrower beamwidth to improve coverage in an edge area (e.g., away from the antenna array) of the wireless communications cell. By forming the wider center RF beam to cover the larger center area, it may be possible to maximize coverage in the wireless communications cell with fewer RF beams, thus helping to reduce computational complexity, processing latency, and energy consumption of the wireless communications apparatus.

Figure 1:
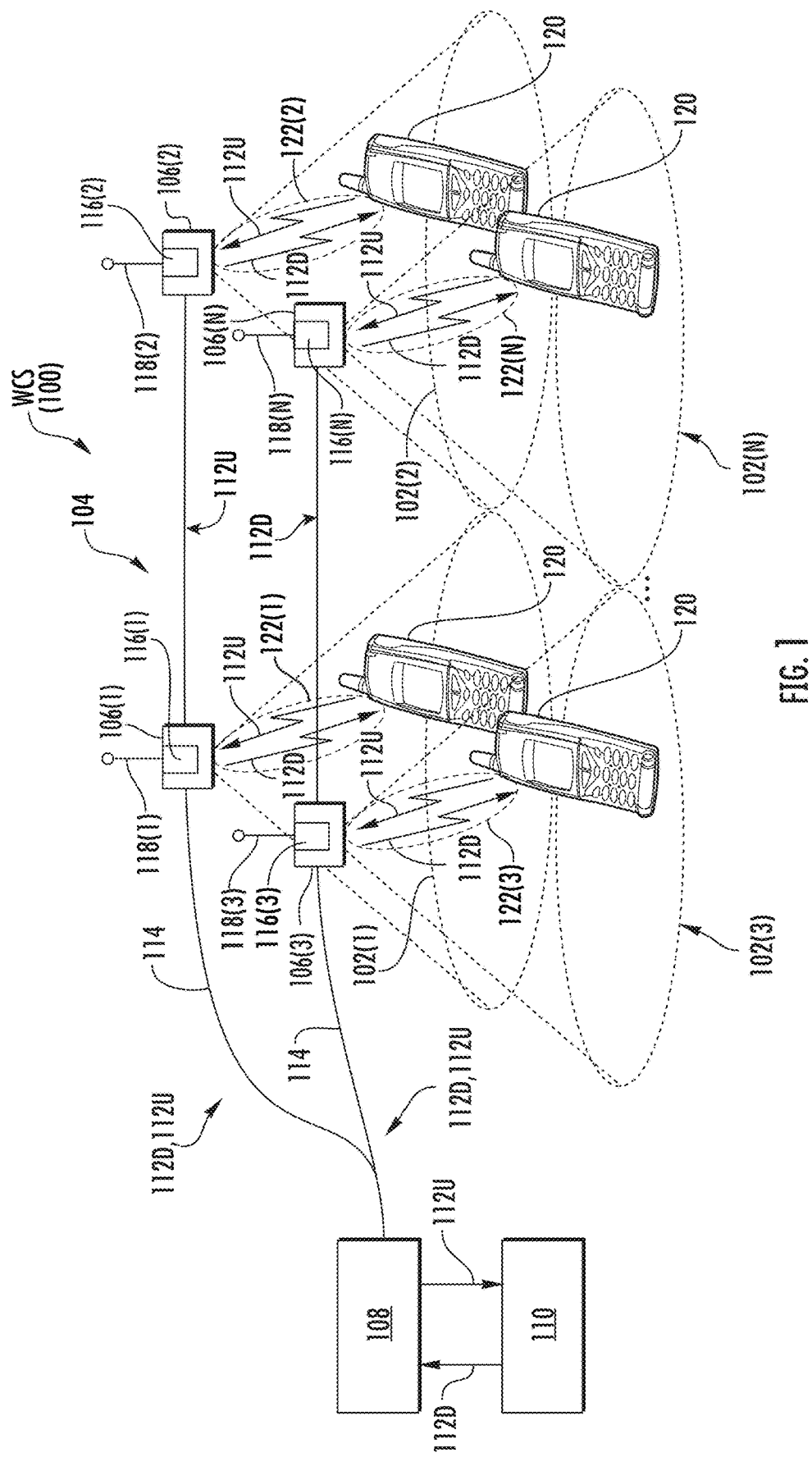
FIG. 1 is a schematic diagram of an exemplary wireless communications system (WCS), such as a distributed communications system (DCS), configured to distribute communications services to remote coverage areas.
Figure 2A:
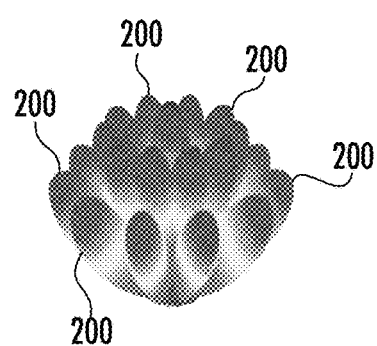
FIGS. 2A-2C are graphic diagrams providing exemplary illustration of a number of fundamental aspects related to radio frequency (RF) beamforming.
Figure 2B:
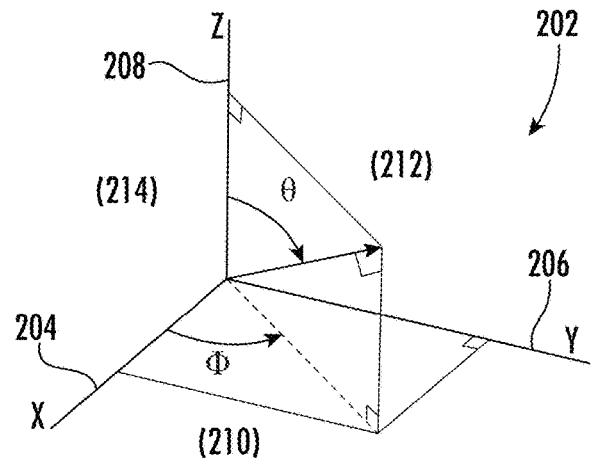
Figure 2C:
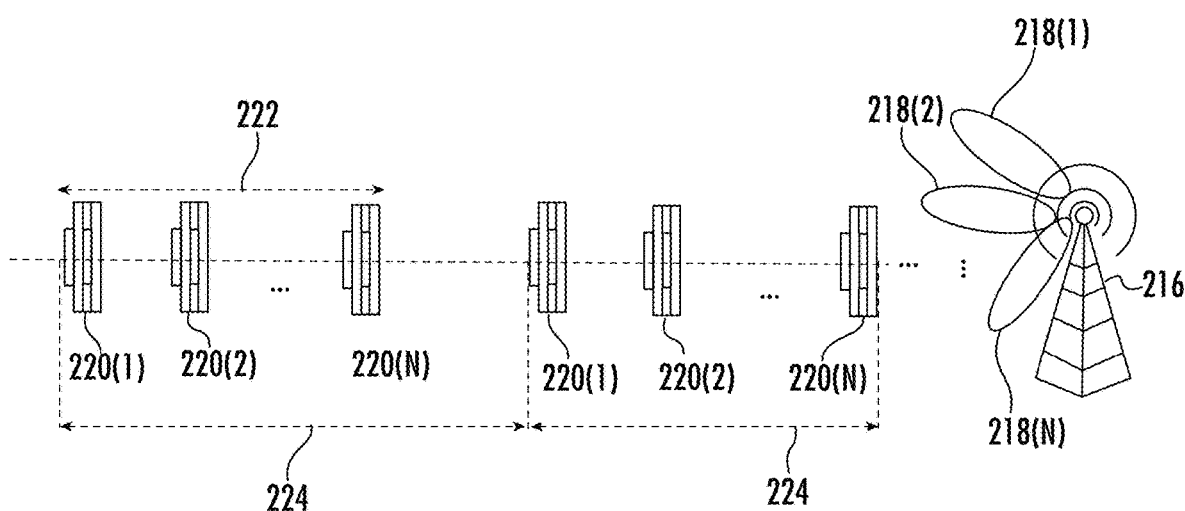
Figure 3:
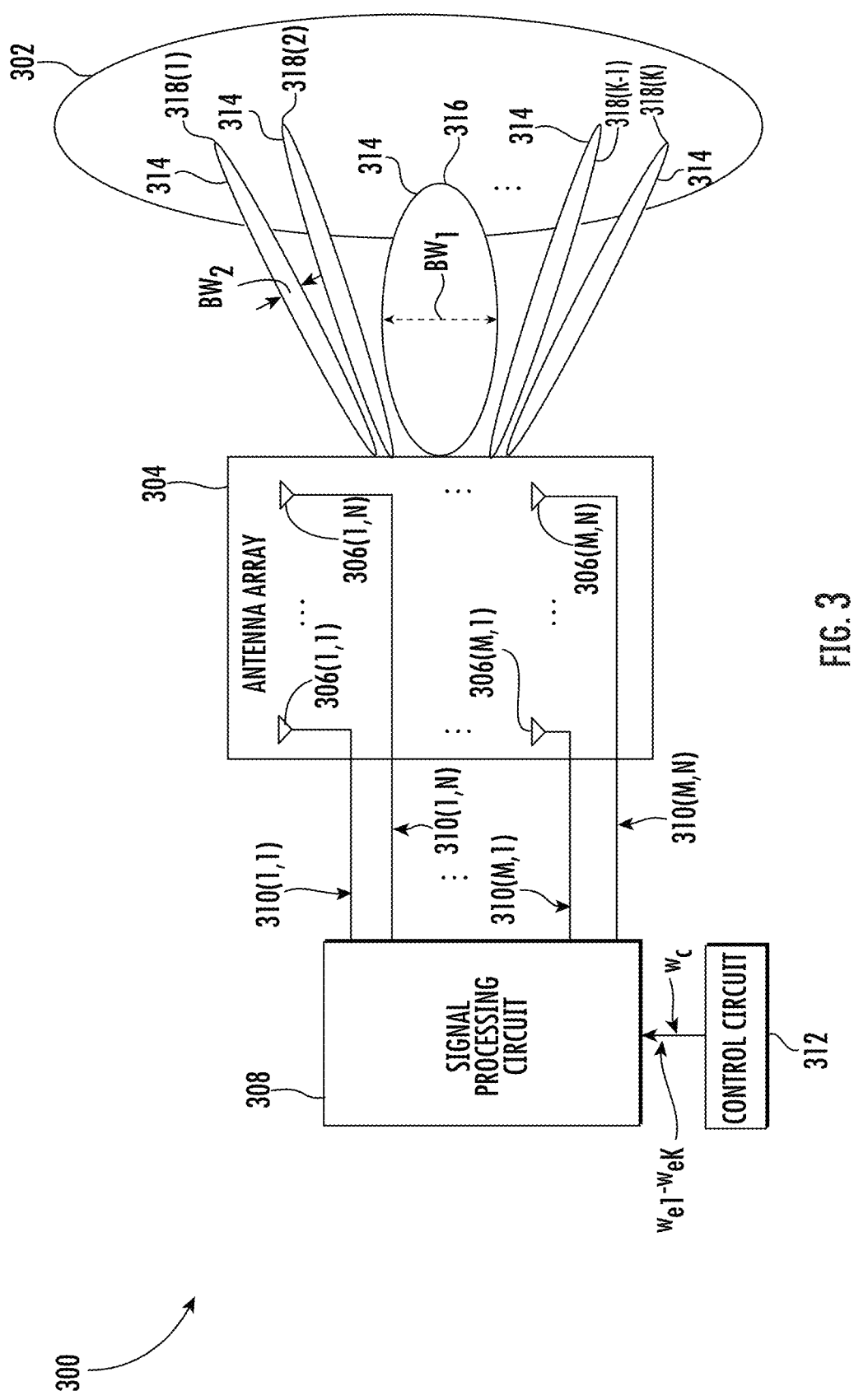
FIG. 3 is a schematic diagram of an exemplary wireless communications apparatus configured to form multi-beamwidth RF beams to maximize RF coverage in a wireless communications cell.

Before discussing a wireless communications apparatus configured to support multi-beamwidth RF beamforming to improve coverage, reduce complexity and latency, and conserve energy starting at FIG. 3, a brief overview is first provided with reference to FIGS. 2A-2C to help explain some fundamental aspects related to RF beamforming.

FIGS. 2A-2C are graphic diagrams providing exemplary illustration of a number of fundamental aspects related to RF beamforming. In general, beamforming refers to a technique that uses multiple antennas to simultaneously radiate an RF signal in an RF spectrum, such as a millimeterwave (mm-Wave) spectrum. The multiple antennas are typically organized into an antenna array (e.g., 4×4, 8×8, 16×16, etc.) and separated from each other by at least one-half (½) wavelength. The RF signal is pre-processed based on a beam weight set, which includes multiple beam weights corresponding to the multiple antennas, respectively, to generate multiple weighted RF signals. The multiple weighted RF signals are then fed to the multiple antennas, respectively, for simultaneous radiation in the RF spectrum. As illustrated in FIG. 2A, by pre-processing the RF signal based on multiple beam weight sets, it may be possible to form multiple RF beams 200 pointing to multiple directions, respectively.

Each beam weight in a given beam weight set is a complex weight consisting of a respective phase term and a respective amplitude term. The phase terms in the complex beam weight can be so determined to cause the multiple simultaneously radiated RF signals to constructively combine in one direction to form the RF beams 200, while destructively averaging out in other directions. In this regard, the phase term can determine how the RF beams 200 are formed and in which direction the RF beams 200 are pointing. On the other hand, the amplitude terms in the complex beam weight may determine how many of the antennas in the antenna array are utilized to simultaneously radiate the RF signals. Notably, when more antennas are utilized to simultaneously radiate the RF signals, the RF beams 200 will become more concentrated to have a narrower beamwidth and a higher beamformed antenna gain. In contrast, when fewer antennas are utilized to simultaneously radiate the RF signals, the RF beams 200 will become more spread out to have a wider beamwidth and a less beamformed antenna gain. In this regard, the amplitude term can determine the beamwidth of the RF beams 200.

FIG. 2B is a graphic diagram of an exemplary spherical coordinate system 202 that helps explain how the complex beam weight can be determined. The spherical coordinate system 202 includes an x-axis 204, a y-axis 206, and a z-axis 208. The x-axis 204 and the y-axis 206 collectively define an x-y plane 210, the y-axis 206 and the z-axis 208 collectively define a y-z plane 212, and the x-axis 204 and the z-axis 208 collectively define an x-z plane 214. Depending how the multiple antennas are arranged in the antenna array, a beam weight $w_n$ may be determined based equations (Eq. 1-Eq. 4) below.

The equation (Eq. 1) below illustrates how a beam weight $w_n$ may be determined when the multiple antennas are arranged linearly along the y-axis 206.

$$w_n = e^{-j2\pi n \cdot \frac{dy}{\lambda} \cdot \sin\theta} \quad (0 \leq n \leq N-1) \quad \text{(Eq. 1)}$$

In the equation (Eq. 1) above, N represents a total number of the antennas in the antenna array, and θ represents a zenith angle. The equation (Eq. 2) below illustrates how a beam weight $w_{m,n}$ may be determined when the multiple antennas are arranged in an M×N matrix in the x-y plane 210.

$$w_{m,n} = e^{-j2\pi m \cdot \frac{dx}{\lambda} \cdot \sin\theta\cos\phi} e^{-j2\pi n \cdot \frac{dy}{\lambda} \cdot \sin\theta\sin\phi} \quad (0 \leq m \leq M-1, 0 \leq n \leq N-1) \quad \text{(Eq. 2)}$$

In the equation (Eq. 2) above, M and N represent the number of rows and the number of columns of M×N matrix, respectively, and ϕ represents an azimuth angle. The equation (Eq. 3) below illustrates how the beam weight $w_{m,n}$ may be determined when the multiple antennas are arranged in an M×N matrix in the y-z plane 212.

$$w_{m,n} = e^{-j2\pi m \cdot \frac{dz}{\lambda} \cdot \cos\theta} e^{-j2\pi n \cdot \frac{dy}{\lambda} \cdot \sin\theta\sin\phi} \quad (0 \leq m \leq M-1, 0 \leq n \leq N-1) \quad \text{(Eq. 3)}$$

The equation (Eq. 4) below illustrates how the beam weight $w_{m,n}$ may be determined when the multiple antennas are arranged in an M×N matrix in the x-z plane 214.

$$w_{m,n} = e^{-j2\pi m \cdot \frac{dx}{\lambda} \cdot \sin\theta\cos\phi} e^{-j2\pi n \cdot \frac{dz}{\lambda} \cdot \cos\theta} \quad (0 \leq m \leq M-1, 0 \leq n \leq N-1) \quad \text{(Eq. 4)}$$

Notably, the equations (Eq. 1-Eq. 4) are non-limiting examples of a so-called "delay-and-sum" method for determining the beam weight $w_{m,n}$. It should be appreciated that the beam weight $w_{m,n}$ may also be determined based on other methods and/or algorithms. Although it may be possible for the antennas in the antenna array to form the multiple RF beams 200 in FIG. 2A in the multiple directions, an actual number of the RF beams 200 is typically limited by a standard-defined parameter known as the synchronization signal block (SSB). In this regard, FIG. 2C is a graphic diagram providing an exemplary illustration on how the SSB limits the actual number the RF beams 200 that may be formed by the antennas in the antenna array.

In conventional wireless systems, such as the third-generation (3G) and the fourth-generation (4G) wireless systems, a base station is typically configured to radiate a cell-wide reference signal omnidirectionally to enable cell discovery and coverage measurement by a user equipment (UE). However, a fifth-generation new-radio (5G-NR) wireless system does not provide the cell-wide reference signal. Instead, a 5G-NR gNB 216 is configured to radiate a number of reference beams 218(1)-218(N) in different directions of a 5G-NR coverage cell. The reference beams 218(1)-218(N) are associated with a number of SSBs 220(1)-220(N), respectively. Each of the SSBs 220(1)-220(N) may include a primary synchronization signal (PSS), a secondary synchronization signal (SSS), and a 5G-NR physical broadcast channel (PBCH).

In this regard, a 5G-NR UE in the 5G-NR coverage cell can sweep through the reference beams 218(1)-218(N) to identify a candidate reference beam(s) associated with a strongest reference signal received power (RSRP). Further, the 5G-NR UE may decode a candidate SSB(s) associated with the identified candidate reference beam(s) to acquire such information as physical cell identification (PCI) and a PBCH demodulation reference signal (DMRS). Based on the candidate reference beam(s) reported by the 5G-NR UE, the 5G-NR gNB 216 may pin point a location of the 5G-NR UE and steer a data-bearing RF beam toward the 5G-NR UE to enable data communication with the 5G-NR UE.

The SSBs 220(1)-220(N) may be organized into an SSB burst set 222 to be repeated periodically in a number of SSB burst periods 224. The SSB burst set 222 may be five-milliseconds (5 ms) in duration, and the SSB burst periods 224 may repeat every twenty milliseconds (20 ms). The beamforming standard, as presently defined by the third-generation partnership project (3GPP), allows a maximum of 64 SSBs to be scheduled in the SSB burst set 222. Accordingly, the 5G-NR gNB 216 can radiate 64 reference beams 218(1)-218(N) in each of the SSB burst periods 224.

Understandably, the 5G-NR gNB 216 will be able to maximize coverage in the 5G-NR coverage cell by radiating the maximum number (e.g., 64) of the reference beams 218(1)-218(N) in each of the SSB burst periods 224. However, radiating the maximum number of the reference beams 218(1)-218(N) can introduce significant overhead in terms of computational complexity and processing delay. As such, it may be desirable to maximize coverage in the 5G-NR coverage cell by radiating as few of the reference beams 218(1)-218(N) as possible.

In this regard, FIG. 3 is a schematic diagram of an exemplary wireless communications apparatus 300 configured to form multi-beamwidth RF beams to optimize RF beamforming to maximize RF coverage in a wireless communications cell 302. The wireless communications apparatus 300 may be provided as a radio node (RN) or a remote unit (RU) in a WCS to form the wireless communications cell 302 (e.g., an indoor small cell) inside a building (e.g., an office building, a shopping mall, an indoor stadium, etc.). The wireless communications apparatus 300 includes an antenna array 304 having a plurality of radiating elements 306(1,1)-306(M,N) (e.g., antennas) organized into 'M' rows and 'N' columns (M and N are both positive whole numbers: M>0, N>0). In examples discussed hereinafter, the wireless communications apparatus 300 is assumed to be mounted on a ceiling of the building with the antenna array 304 facing downward toward floor (e.g., parallel to the floor or with a tilt angle relative to the floor). However, it should be appreciated that the wireless communications apparatus 300 can be mounted on any fixture (e.g., a wall, a support beam, etc.) in the building and the antenna array 304 can be so installed to face any direction, without changing the operating principles discussed herein.

The wireless communications apparatus 300 includes a signal processing circuit 308, which can be implemented as by a field-programmable gate array (FPGA) for example, configured to generate a plurality of weighted RF communications signals 310(1,1)-310(M,N) each corresponding to a respective one of the radiating elements 306(1,1)-306(M,N). According to previous discussions in FIGS. 2A-2C, if the weighted RF communications signals 310(1,1)-310(M,N) are generated based on a set of appropriately determined beam weights, the weighted RF communications signals 310(1,1)-310(M,N) radiated from the radiating elements 306(1,1)-306(M,N) will constructively combine to form an RF beam in one direction and destructively average out in other directions. Thus, by generating the weighted RF communications signals 310(1,1)-310(M,N) based on multiple sets of appropriately determined beam weights, the radiating elements 306(1,1)-306(M,N) will be able to form multiple RF beams in multiple directions.

In this regard, the wireless communications apparatus 300 includes a control circuit 312, which can be implemented by an FPGA for example. As discussed below, the control circuit 312 is configured to determine multiple sets of beam weights to cause the radiating elements 306(1,1)-306(M,N) to radiate multiple RF beams 314 in the wireless communications cell 302. More specifically, the control circuit 312 can cause the radiating elements 306(1,1)-306(M,N) to radiate a smallest-possible number of the RF beams 314 to provide adequate RF coverage in the wireless communications cell 302 by capitalizing on the fact that the wireless communications apparatus 300 is mounted on an indoor ceiling with the antenna array 304 facing downward toward the floor.

Notably, the indoor ceiling can have a limited height (e.g., 10 feet) from the floor. As such, the weighted RF communications signals 310(1,1)-310(M,N) radiated from the antenna array 304 may experience a lower propagation loss to reach an area near the antenna array 304 (hereinafter referred to as a "center area" of the wireless communications cell 302) and thus requiring a lower beamformed antenna gain. In a non-limiting example, the center area can be an area in the wireless communications cell 302 that is within 15-meter radias around the antenna array 304. Accordingly, the control circuit 312 can be configured to determine a center beam weight set $w_c$ that includes a plurality of center beam weights $w_c(1,1)$-$w_c(M,N)$ each corresponding to a respective one of the radiating elements 306(1,1)-306(M,N). The center beam weight set $w_c$ may be so determined based on any of the equations (Eq. 1-Eq. 4) above to cause the antenna array 304 to radiate a center RF beam 316 as one of the RF beams 314. In a non-limiting example, the center RF beam 316 is associated with a center beamwidth $BW_1$ and steered toward the center area.

In contrast, the weighted RF communications signals 310(1,1)-310(M,N) radiated from the antenna array 304 may experience a higher propagation loss to reach areas farther away from the antenna array 304 (hereinafter referred to as an "edge area" of the wireless communications cell 302) and thus requiring a higher beamformed antenna gain. In a non-limiting example, the edge area can be an area in the wireless communications cell 302 that is outside the 15-meter radias around the antenna array 304. Accordingly, the control circuit 312 can be configured to determine a plurality of edge beam weight sets $w_{e1}$-$w_{eK}$ that each include a plurality of edge beam weights $w_e(1,1)$-$w_e(M,N)$. Each of the edge beam weights $w_e(1,1)$-$w_e(M,N)$ corresponds to a respective one of the radiating elements 306(1,1)-306(M,N). The edge beam weight sets $w_{e1}$-$w_{eK}$ may be so determined based on any of the equations (Eq. 1-Eq. 4) above to cause the antenna array 304 to radiate a plurality of edge RF beams 318(1)-318(K) among the RF beams 314. In a non-limiting example, each of the edge RF beams 318(1)-318(K) may be associated with an edge beamwidth $BW_2$ that is narrower than the center beamwidth $BW_1$ and steered toward the edge area.

In this regard, the edge RF beams 318(1)-318(K) are more focused to have a higher beamformed antenna gain than the center RF beam 316. By forming the wider center RF beam 316 to cover a larger center area of the wireless communications cell 302 and forming the narrower edge RF beams 318(1)-318(K) to cover the edge area of the wireless communications cell 302, it may be possible to maximize RF coverage in the wireless communications cell 302 with fewer RF beams, thus helping to reduce computational complexity, processing latency, and energy consumption of the wireless communications apparatus 300.

Figure 4:
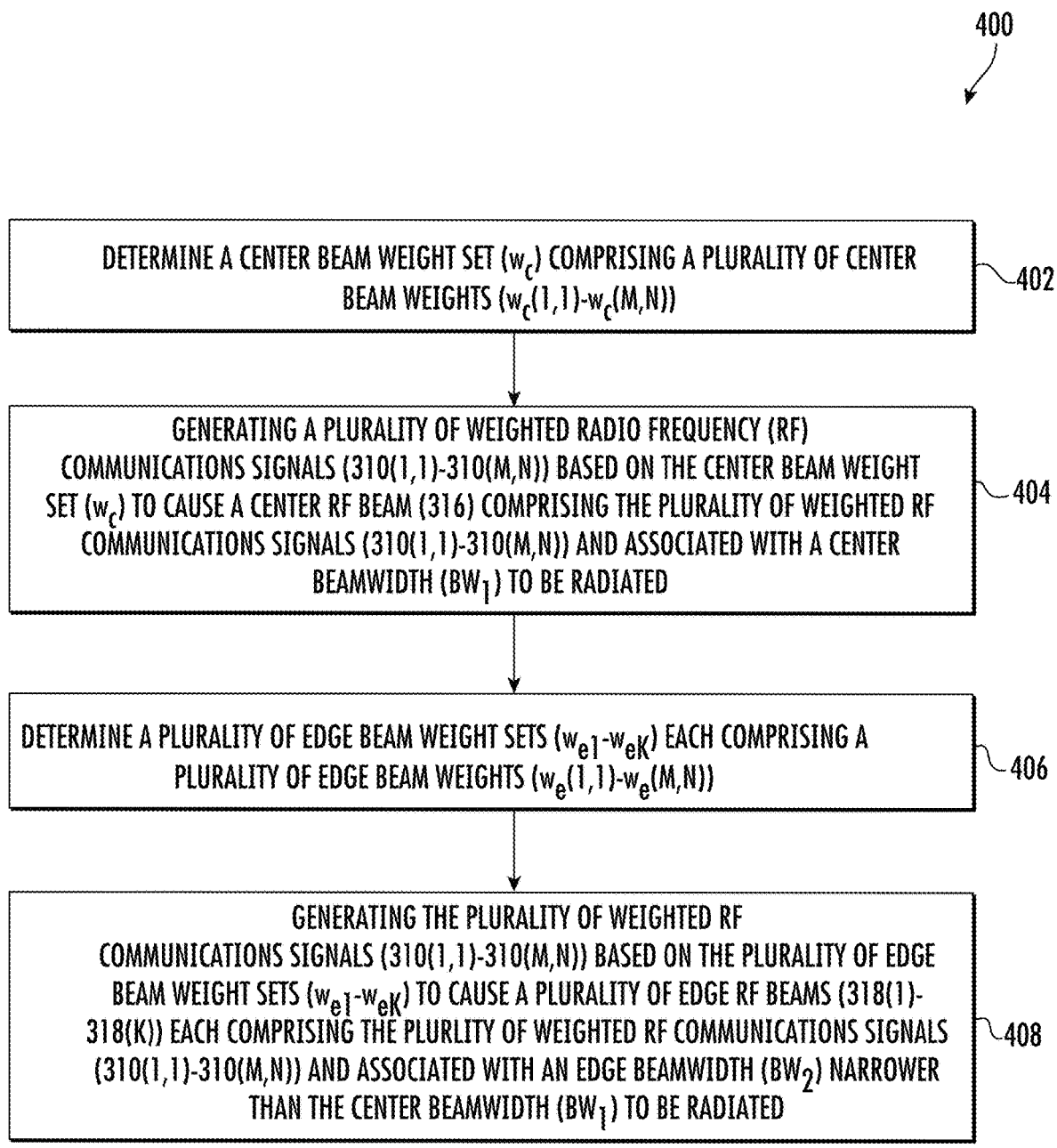
FIG. 4 is a flowchart of an exemplary process that can be employed by the wireless communications apparatus of FIG. 3 to form multi-beamwidth RF beams to maximize coverage in a wireless communications cell of the WCS.

The wireless communications apparatus 300 can be configured to optimize RF beamforming to maximize coverage in the wireless communications cell 302 based on a process. In this regard, FIG. 4 is a flowchart of an exemplary process 400 that can be employed by the wireless communications apparatus 300 of FIG. 3 to form multi-beamwidth RF beams to optimize RF beamforming to maximize coverage in the wireless communications cell 302.

Specifically, the wireless communications apparatus 300 can be configured to determine the center beam weight set $w_c$ that includes the center beam weights $w_c(1,1)$-$w_c(M,N)$ (block 402). The wireless communications apparatus 300 can be configured to generate the weighted RF communications signals 310(1,1)-310(M,N) based on the center beam weight set $w_c$ to cause the center RF beam 316, which includes the weighted RF communications signals 310(1,1)-310(M,N) and associated with the center beamwidth $BW_1$, to be radiated (block 404). The wireless communications apparatus 300 can be configured to determine the edge beam weight sets $w_{e1}$-$w_{eK}$ each includes the edge beam weights $w_e(1,1)$-$w_e(M,N)$ (block 406). The wireless communications apparatus 300 can be configured to generate the weighted RF communications signals 310(1,1)-310(M,N) based on the edge beam weight sets $w_{e1}$-$w_{eK}$ to cause the edge RF beams 318(1)-318(K) each includes the weighted RF communications signals 310(1,1)-310(M,N) and associated with the edge beamwidth $BW_2$ narrower than the center beamwidth $BW_1$ to be radiated (block 408).

Figure 5A:
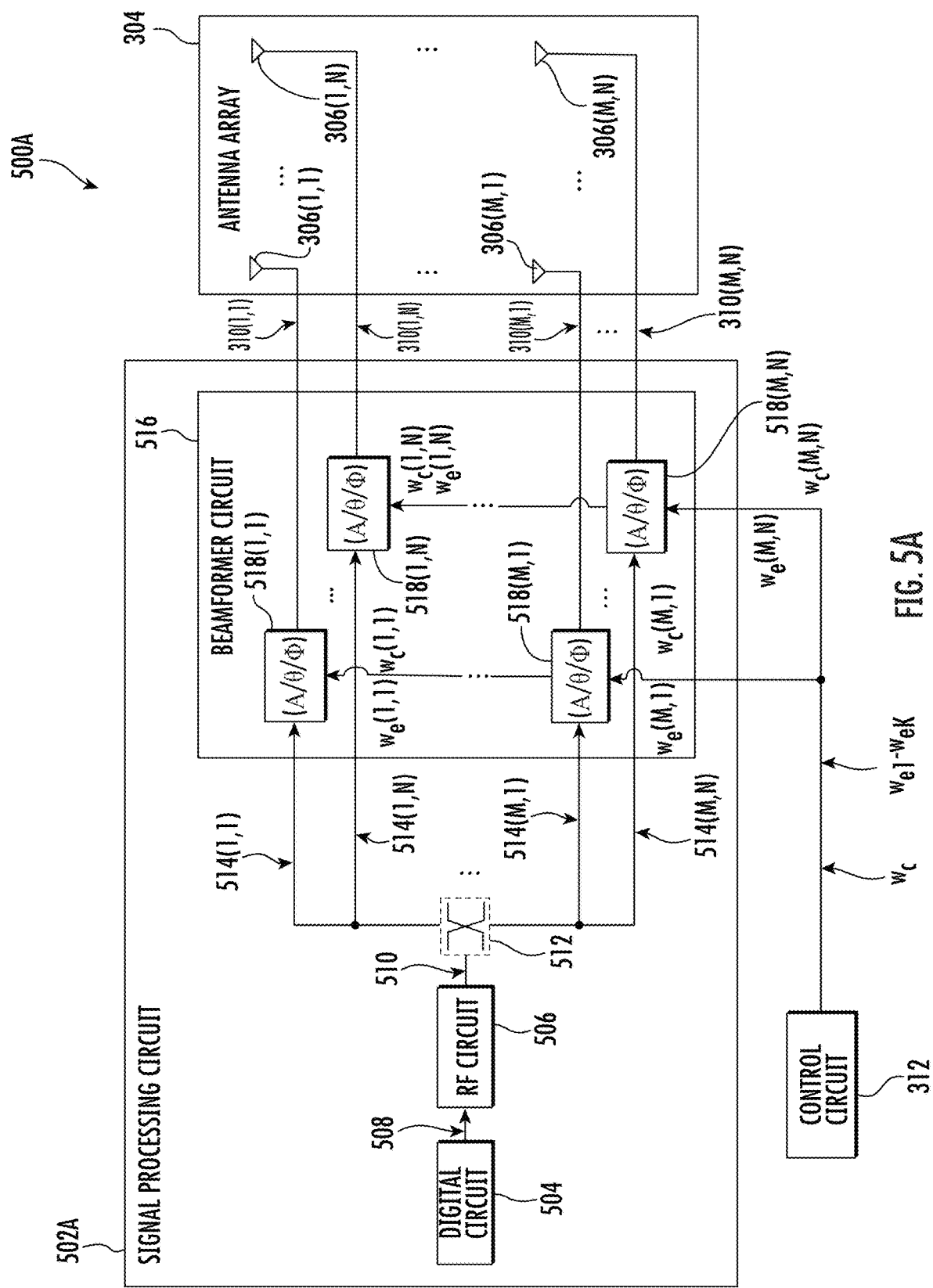
FIG. 5A is a schematic diagram of an exemplary wireless communications apparatus configured to enable multi-beamwidth RF beamforming optimization based on an analog beamforming configuration.

The wireless communications apparatus 300 of FIG. 3 can be configured to optimize RF beamforming based on a variety of beamforming configurations, including but not limited to analog beamforming, digital beamforming, and hybrid beamforming. In this regard, FIG. 5A is a schematic diagram of an exemplary wireless communications apparatus 500A configured to enable multi-beamwidth RF beamforming optimization based on an analog beamforming configuration. Common elements between FIGS. 3 and 5A are shown therein with common element numbers and will not be re-described herein.

The wireless communications apparatus 500A includes a signal processing 502A configured to generate the weighted RF communications signals 310(1,1)-310(M,N) based on the center beam weight set $w_c$ and the edge beam weight sets $w_{e1}$-$w_{eK}$. The signal processing circuit 502A includes a digital circuit 504 and an RF circuit 506. The digital circuit 504 is configured to generate a digital communications signal 508, and the RF circuit 506 is configured to convert the digital communications signal 508 into an RF communications signal 510. The signal processing circuit 502A may include a signal splitter 512 configured to split the RF communications signal 510 into a plurality of RF communications signals 514(1,1)-514(M,N) containing identical information.

The signal processing circuit 502A includes a beamformer circuit 516, which may include a plurality of analog signal processing circuits 518(1,1)-518(M,N). According to previous discussion in FIG. 2B, each of the center beam weights $w_c(1,1)$-$w_c(M,N)$ in the center beam weight set $w_c$ and each of the edge beam weights $w_e(1,1)$-$w_e(M,N)$ in each of the edge beam weight sets $w_{e1}$-$w_{eK}$ can be a complex weight including an amplitude term and a phase term. In this regard, the control circuit 312 can be configured to control each of the analog signal processing circuits 518(1,1)-518(M,N) to adjust an amplitude A, a zenith angle $\theta$, and an azimuth angle $\phi$ of a respective one of the RF communications signals 514(1,1)-514(M,N) based on the center beam weight set $w_c$ and the edge beam weight sets $w_{e1}$-$w_{eK}$.

Figure 5B:
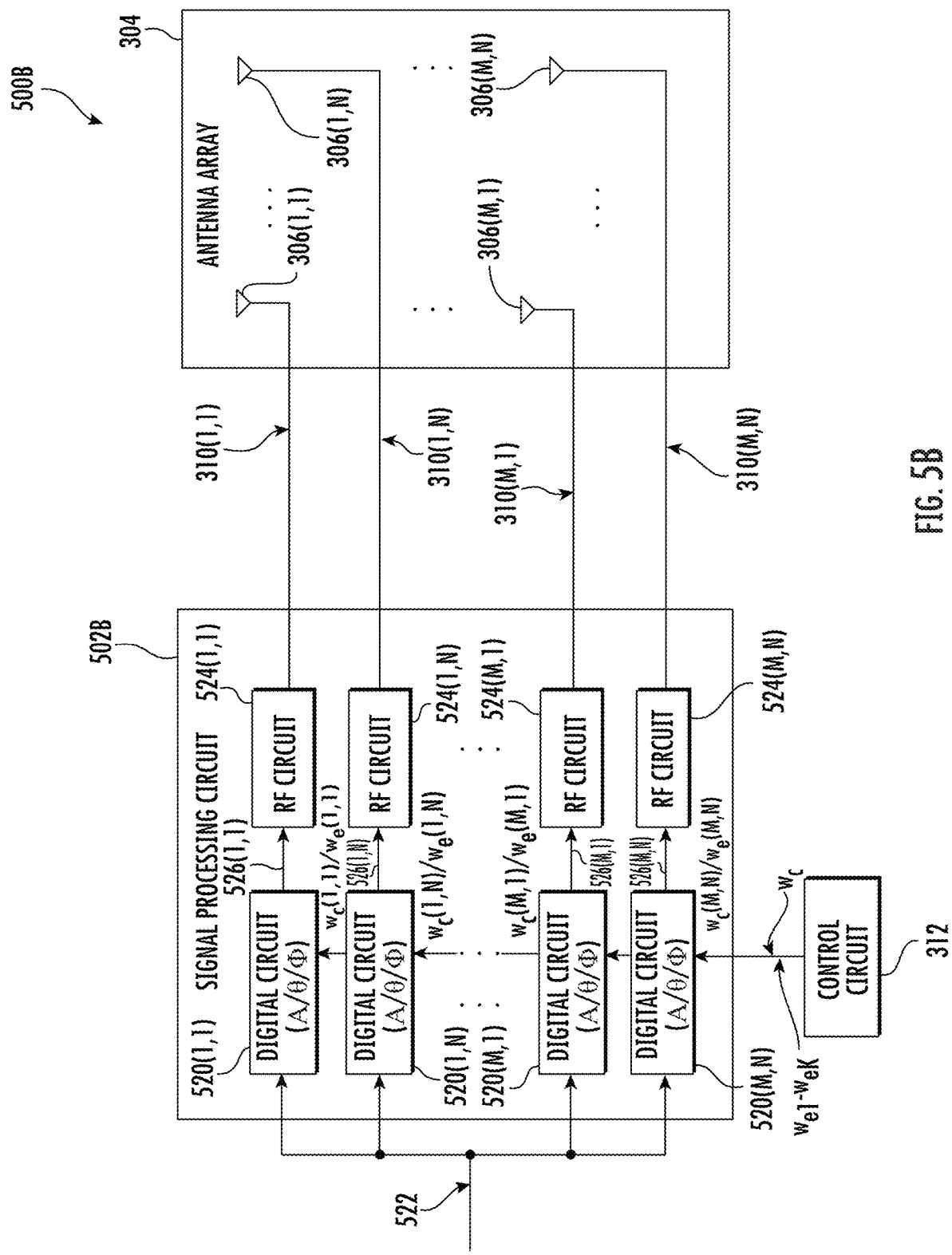
FIG. 5B is a schematic diagram of an exemplary wireless communications apparatus configured to enable multi-beamwidth RF beamforming optimization based on a digital beamforming configuration.

FIG. 5B is a schematic diagram of an exemplary wireless communications apparatus 500B configured to enable multi-beamwidth RF beamforming optimization based on an analog beamforming configuration. Common elements between FIGS. 3 and 5B are shown therein with common element numbers and will not be re-described herein.

The wireless communications apparatus 500B includes a signal processing 502B configured to generate the weighted RF communications signals 310(1,1)-310(M,N) based on the center beam weight set $w_c$ and the edge beam weight sets $w_{e1}$-$w_{eK}$. The signal processing circuit 502B includes a plurality of digital circuits 520(1,1)-520(M,N) each configured to receive a digital communications signal 522. The signal processing circuit 502B also includes a plurality of RF circuits 524(1,1)-524(M,N) coupled to the digital circuits 520(1,1)-520(M,N), respectively. The control circuit 312 can be configured to control the digital circuits 520(1,1)-520(M,N) to adjust an amplitude A, a zenith angle $\theta$, and an azimuth angle $\phi$ of the digital communications signal 522 based on the center beam weight set $w_c$ and the edge beam weight sets $w_{e1}$-$w_{eK}$. Accordingly, the digital circuits 520(1,1)-520(M,N) generate a plurality of weighted digital communications signals 526(1,1)-526(M,N), respectively. The RF circuits 524(1,1)-524(M,N) are configured to convert the weighted digital communications signals 526(1,1)-526(M,N) into the weighted RF communications signals 310(1,1)-310(M,N), respectively.

The wireless communications apparatus 300 of FIG. 3 may be flexibly configured to improve RF coverage in the wireless communications cell 302 based on a number of beamforming embodiments. More specifically, the control circuit 312 may dynamically control the signal processing circuit 308 to change the number, the direction, and/or the pattern of the RF beams 314 formed by the antenna array 304. Non-limiting examples of the various multi-beamwidth beamforming embodiments are discussed next with reference to FIGS. 6A-6C and 7A-7C. Common elements between FIGS. 3, 6A-6C, and 7A-7C are shown therein with common element numbers and will not be re-described herein.

In examples discussed hereinafter, it is assumed that the antenna array 304 is an eight-by-eight (8×8) antenna array consisting of a total of sixty-four (64) radiating elements organized into 8 rows and 8 columns. It should be noted that the 8×8 antenna array is merely a non-limiting example of many feasible configurations of the antenna array 304 and should not be read as being limiting. For example, the antenna array 304 can be configured to include more or less than 64 radiating elements organized into an X-dimension array (X≥1). Although the examples in FIGS. 6A-6C and 7A-7C are discussed based on the assumption that the wireless communications apparatus 300 is ceiling-mounted with the antenna array 304 facing downwards toward the floor, it should be appreciated that the configuration and operation principles discussed in FIGS. 6A-6C and 7A-7C may be adapted to support other types of antenna array orientations.

Figure 6A:
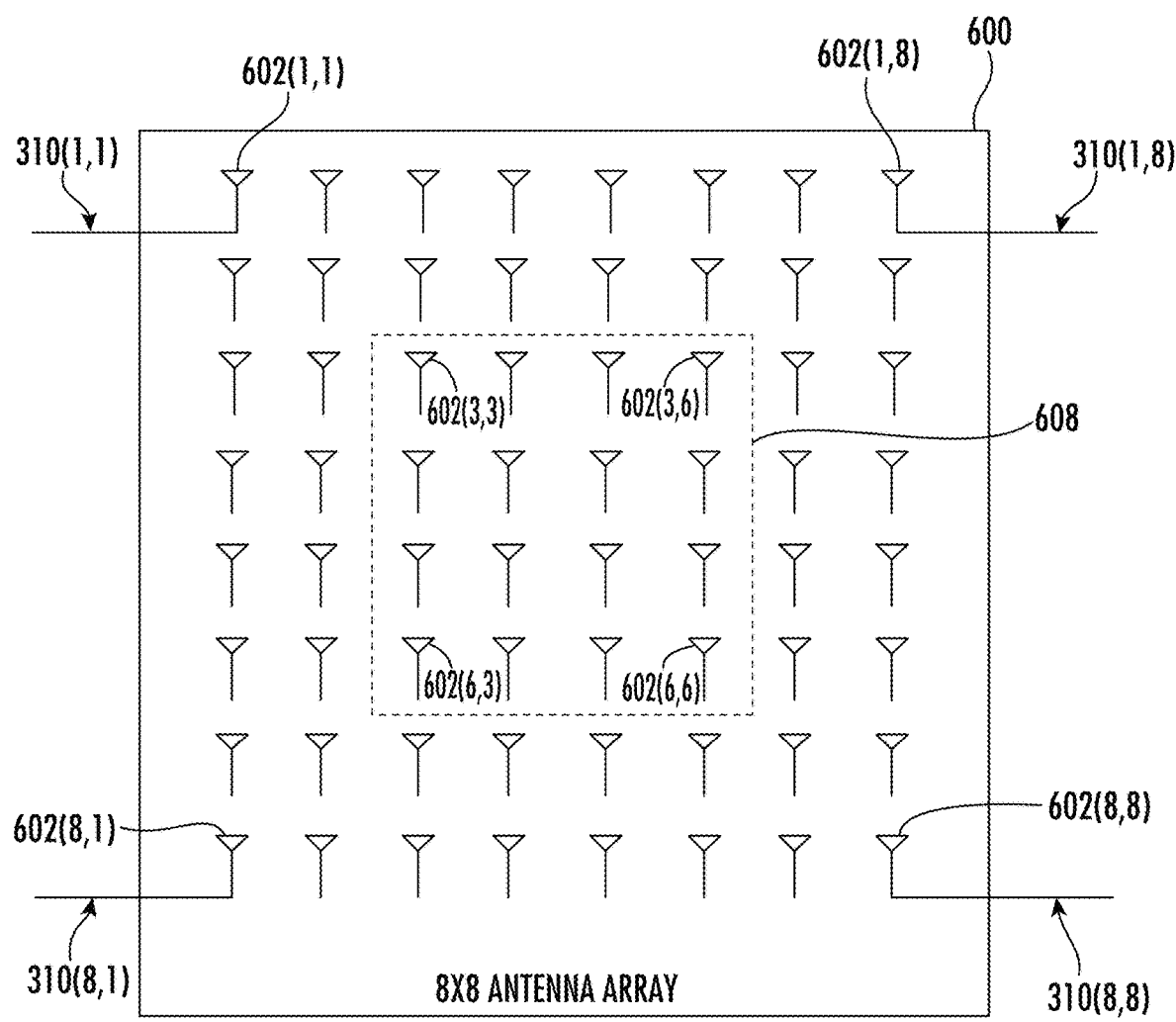
FIGS. 6A-6C are diagrams providing exemplary illustrations of the wireless communications apparatus of FIG. 3 configured to form multi-beamwidth RF beams to improve RF coverage in the wireless communications cell.
Figure 6B:
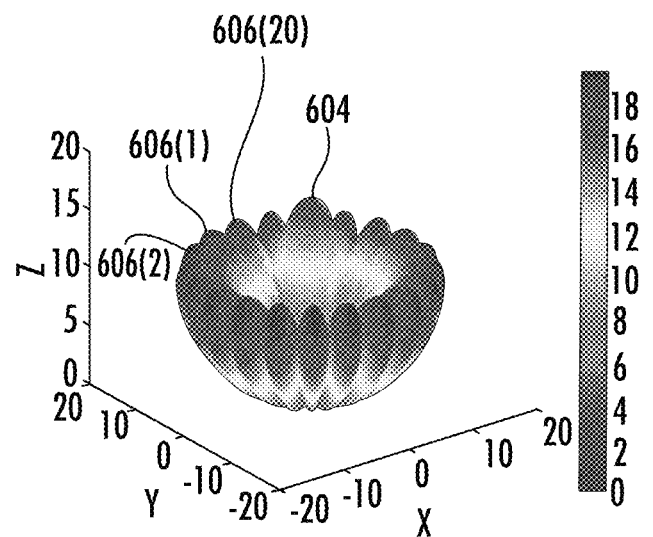
Figure 6C:
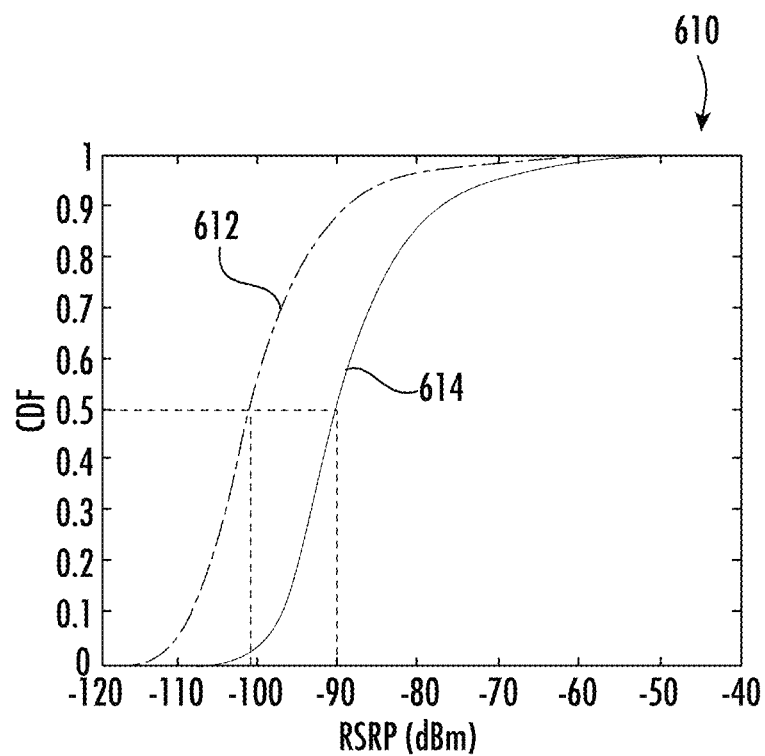

FIGS. 6A-6C are diagrams providing exemplary illustrations of the wireless communications apparatus 300 of FIG. 3 configured to form multi-beamwidth RF beams to improve RF coverage in the wireless communications cell 302. FIG. 6A is a schematic diagram of an exemplary 8×8 antenna array 600, which can be provided in the wireless communications apparatus 300 of FIG. 3 as a non-limiting implementation of the antenna array 304. The antenna array 600 includes 64 radiating elements 602(1,1)-602(8,8). Accordingly, the signal processing circuit 308 in the wireless communications apparatus 300 is configured to generate the weighted RF communications signals 310(1,1)-310(8,8) corresponding to the radiating elements 602(1,1)-602(8,8), respectively. In this regard, the control circuit 312 in the wireless communications apparatus 300 is configured to determine the center beam weight set $w_c$ including the center beam weights $w_c(1,1)$-$w_c(8,8)$ and the edge beam weight sets $w_{e1}$-$w_{eK}$ including the edge beam weights $w_e(1,1)$-$w_e(8,8)$.

The control circuit 312 is configured to determine the center beam weight set $w_c$ based on a first zenith angle $\theta_1$ and a first azimuth angle $\phi_1$. In a non-limiting example, the first zenith angle $\theta_1$ and the first azimuth angle $\phi_1$ are both equal to zero degrees (0°). The control circuit 312 is also configured to determine each of the edge beam weight sets $w_{e1}$-$w_{eK}$ based on a second zenith angle $\theta_2$ and a respective one of a plurality of second azimuth angles $\phi_{2-1}$-$\phi_{2-K}$. In a non-limiting example, the second zenith angle $\theta_2$ is equal to 60°, and the second azimuth angles $\theta_{2\text{-}1}$-$\phi_{2\text{-}K}$ are between 0° and 330° with a 30° spacing. As a result, as further illustrated in FIG. 6B, the antenna array 600 is able to radiate a total of twenty-one RF beams, including one (1) center RF beam 604 and twenty (20) edge RF beams 606(1)-606(20).

According to previous discussion in FIG. 3, the center RF beam 604 is associated with a wider center beamwidth $BW_1$, and each of the edge RF beams 606(1)-606(20) is associated with a narrower edge beamwidth $BW_2$. To cause each of the edge RF beams 606(1)-606(20) to be radiated with the narrower edge beamwidth $BW_2$, the control circuit 312 is further configured to cause the antenna array 600 to radiate each of the edge RF beams 606(1)-606(20) from all of the radiating elements 602(1,1)-602(8,8). In contrast, to cause the center RF beam 604 to be radiated with the wider center beamwidth $BW_1$, the control circuit 312 is further configured to cause the antenna array 600 to radiate the center RF beam 604 from a subset of the radiating elements 602(1,1)-602(8,8). In a non-limiting example, the control circuit 312 may cause the center RF beam 604 to be radiate from a four-by-four (4×4) antenna subarray 608 consisting of the radiating elements 602(3,3)-602(6,6) among the radiating elements 602(1,1)-602(8,8) in the antenna array 600. In this regard, the control circuit 312 may determine the center beam weights $w_c(3,3)$-$w_c(6,6)$ as being non-zero center beam weights, while zerorizing the rest of the center beam weights in the center beam weight set $w_c$.

The center RF beam 604 and the edge RF beams 606(1)-606(20) generated based on the above-described beamforming embodiment may improve RF coverage in the wireless communications cell 302 of FIG. 3. In this regard, FIG. 6C is a cumulative distribution function (CDF) plot 610 providing an exemplary illustration of the RF coverage improvement that may be achieved by the specific beamforming embodiment described in FIGS. 6A and 6B.

In a non-limiting example, the RF coverage in the wireless communications cell 302 can be determined based on a distribution of the RSRPs reported by UEs located in the wireless communications cell 302. In this regard, the CDF plot 610 includes a first CDF curve 612 illustrating a respective RSRP distribution before employing the beamforming embodiment described in FIGS. 6A and 6B. The CDF plot 610 also includes a second CDF curve 614 illustrating a respective RSRP distribution after employing the beamforming embodiment described in FIGS. 6A and 6B. According to the first CDF curve 612, approximately fifty-percent (50%) of the UEs have reported RSRPs below −100 dBm prior to employing the beamforming embodiment described in FIGS. 6A and 6B. In contrast, according to the second CDF curve 614, less than 5% of the UEs have reported RSRPs below −100 dBm after employing the beamforming embodiment described in FIGS. 6A and 6B. In this regard, it is evident that the beamforming embodiment described in FIGS. 6A and 6B can bring significant improvement in RF coverage in the wireless communications cell 302.

Figure 7A:
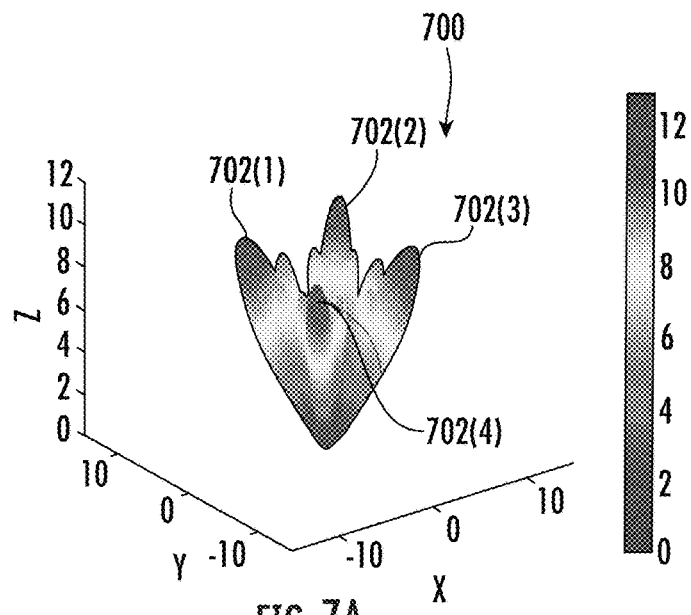
FIGS. 7A-7C are diagrams providing exemplary illustrations of the wireless communications apparatus of FIG. 3 configured to form multi-beamwidth RF beams to improve RF coverage in the wireless communications cell.
Figure 7B:
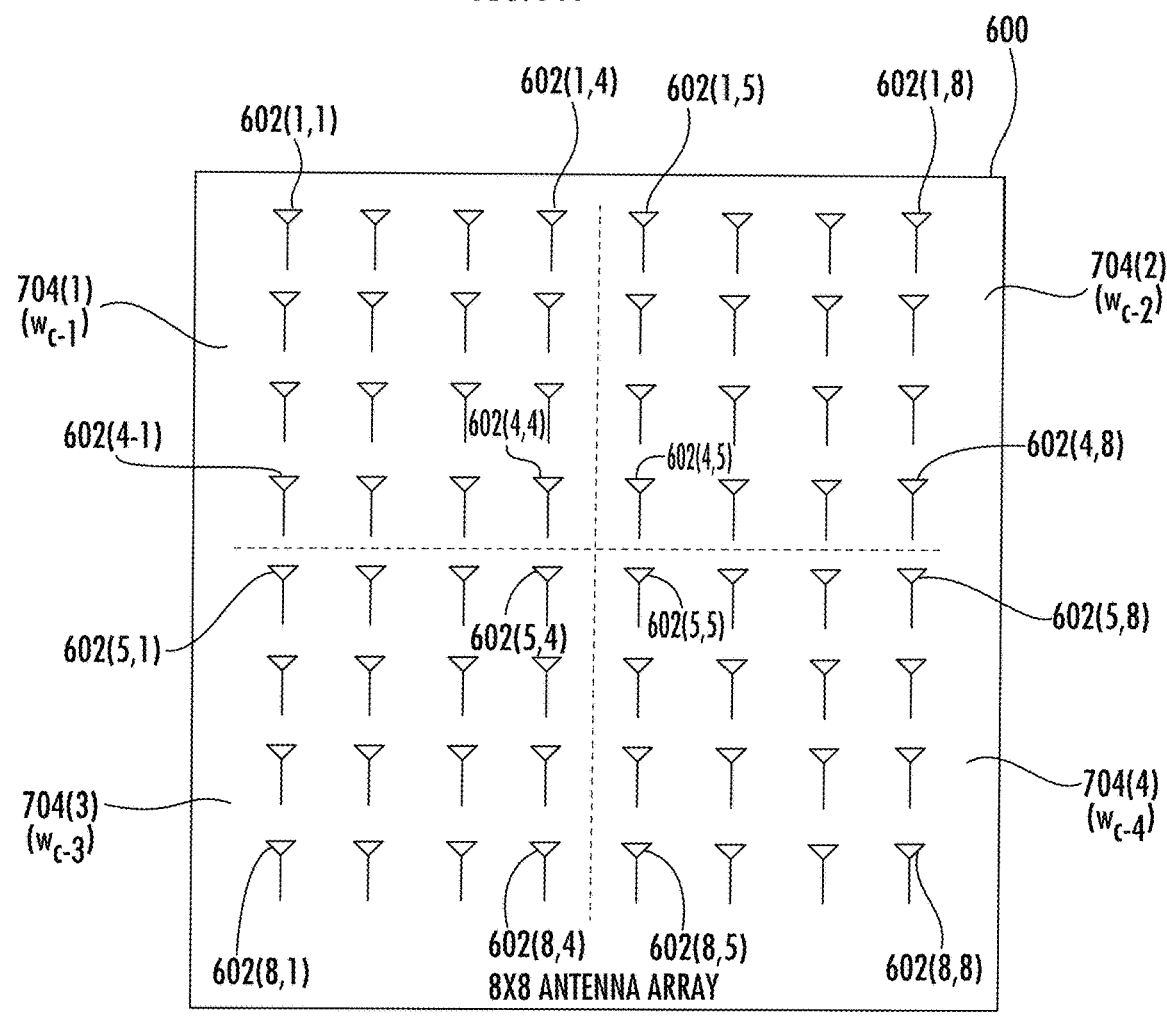
Figure 7C:
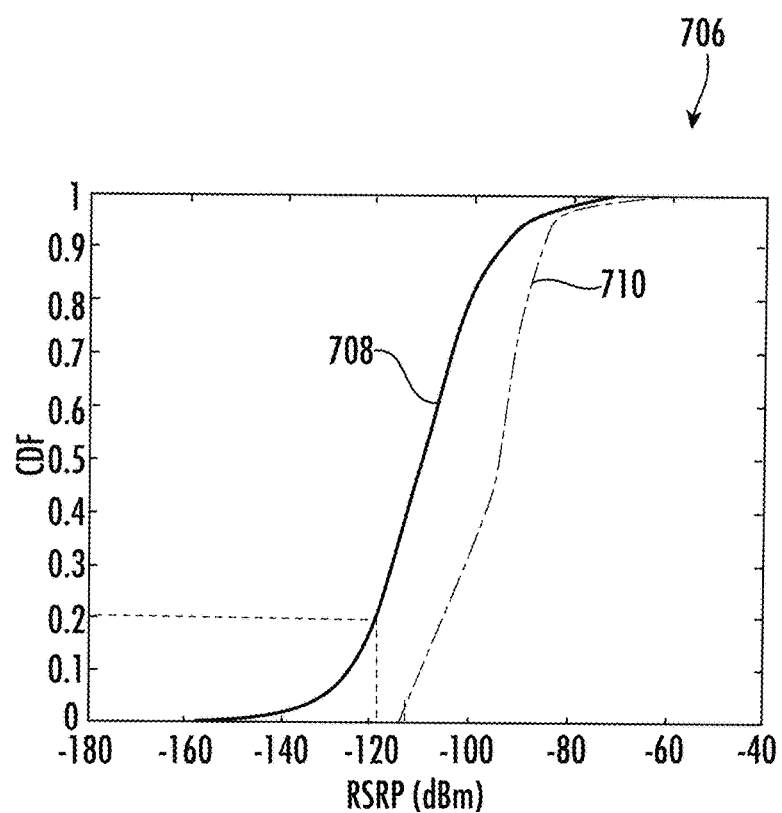

FIGS. 7A-7C are diagrams providing exemplary illustrations of the wireless communications apparatus 300 of FIG. 3 configured to form multi-beamwidth RF beams to improve RF coverage in the wireless communications cell 302. The center RF beam 604 in FIG. 6B as formed by the antenna array 600 in FIG. 6A is a single-peak RF beam. In an alternative embodiment, it may be possible to form the center RF beam 604 as a multi-peak RF beam to further improve RF coverage in the wireless communications cell 302.

In this regard, FIG. 7A is a graphic diagram providing an exemplary illustration of a multi-peak center RF beam 700 that may be formed by the antenna array 600 of FIG. 6A. In a non-limiting example, the multi-peak center RF beam 700, as illustrated in FIG. 7A, includes a plurality of peaks 702(1)-702(4). However, it should be appreciated that it is also possible to form the multi-peak center RF beam 700 with more or less than the peaks 702(1)-702(4).

FIG. 7B is a schematic diagram providing an exemplary illustration of the antenna array 600 of FIG. 6A configured to radiate the multi-peak center RF beam 700 with the peaks 702(1)-702(4). To form the multi-peak center RF beam 700 with the peaks 702(1)-702(4), the antenna array 600 may be divided into a plurality of radiating element sections 704(1)-704(4) each including 4×4 radiating elements. In a non-limiting example, the radiating element section 704(1) includes the radiating elements 602(1,1)-602(4,4), the radiating element section 704(2) includes the radiating elements 602(1,5)-602(4,8), the radiating element section 704(3) includes the radiating elements 602(5,1)-602(8,4), and the radiating element section 704(4) includes the radiating elements 602(5,5)-602(8,8).

The control circuit 312 may be configured to determine the center beam weight set $w_c$ to include a plurality of center beam weight subsets $w_{c\text{-}1}$-$w_{c\text{-}4}$ that each correspond to a respective one of the radiating element sections 704(1)-704(4). In a non-limiting example, the control circuit 312 can determine the center beam weight subsets $w_{c\text{-}1}$-$w_{c\text{-}4}$ based on the same first zenith angle $\theta_1$ as described in FIG. 6A. However, in this beamforming embodiment, the control circuit 312 is configured to determine the center beam weight subsets $w_{c\text{-}1}$-$w_{c\text{-}4}$ based on a plurality of first azimuth angles $\phi_{1\text{-}1}$-$\phi_{1\text{-}4}$ each corresponding to a respective one of the peaks 702(1)-704(4). In a non-limiting example, the first azimuth angles $\phi_{1\text{-}1}$-$\phi_{1\text{-}4}$ can be equal to 45°, 135°, 215°, and 305°, respectively.

In addition to radiating the multi-peak center RF beam 700 with the peaks 702(1)-702(4), the control circuit 312 can determine the edge beam weights $w_e(1,1)$-$w_e(8,8)$ based on the same principle as described in FIG. 6A to cause the antenna array 600 to radiate the edge RF beams 606(1)-606(20). The combination of the multi-peak center RF beam 700 and the edge RF beams 606(1)-606(20) may provide further improvement in terms of RF coverage in the wireless communications cell 302. In this regard, FIG. 7C is a CDF plot 706 providing an exemplary illustration of the RF coverage improvement that may be achieved by the specific beamforming embodiment described in FIGS. 7A and 7B.

The CDF plot 706 includes a first CDF curve 708 illustrating a respective RSRP distribution before employing the beamforming embodiment described in FIGS. 7A and 7B. The CDF plot 706 also includes a second CDF curve 710 illustrating a respective RSRP distribution after employing the beamforming embodiment described in FIGS. 7A and 7B. According to the first CDF curve 708, approximately twenty-percent (20%) of the UEs have reported RSRPs below −120 dBm prior to employing the beamforming embodiment described in FIGS. 7A and 7B. In contrast, according to the second CDF curve 710, none of the UEs have reported RSRPs below −120 dBm after employing the beamforming embodiment described in FIGS. 7A and 7B. In this regard, it is evident that the beamforming embodiment described in FIGS. 7A and 7B can bring significant improvement in RF coverage in the wireless communications cell 302.

Figure 8A:
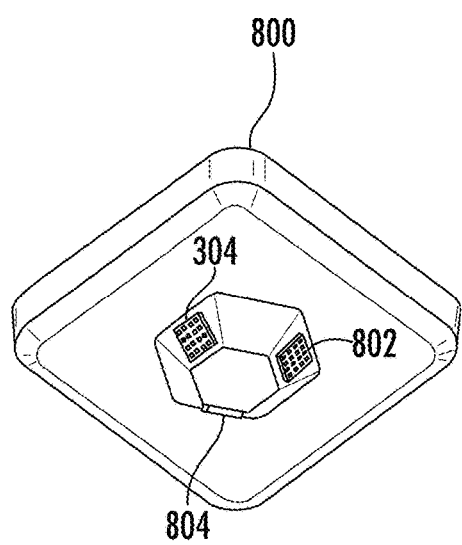
FIG. 8A is a schematic diagram of an exemplary wireless communications apparatus configured to enable sectorized multi-beamwidth RF beamforming in the wireless communications cell of FIG. 3.

The wireless communications apparatus 300 in FIG. 3 may be configured to include additional antenna arrays to enable sectorized RF beamforming. In this regard, FIG. 8A is schematic diagram of an exemplary wireless communications apparatus 800 configured to enable sectorized multi-beamwidth RF beamforming in the wireless communications cell 302 of FIG. 3. Common elements between FIGS. 3 and 8A are shown therein with common element numbers and will not be re-described herein.

Figure 8B:
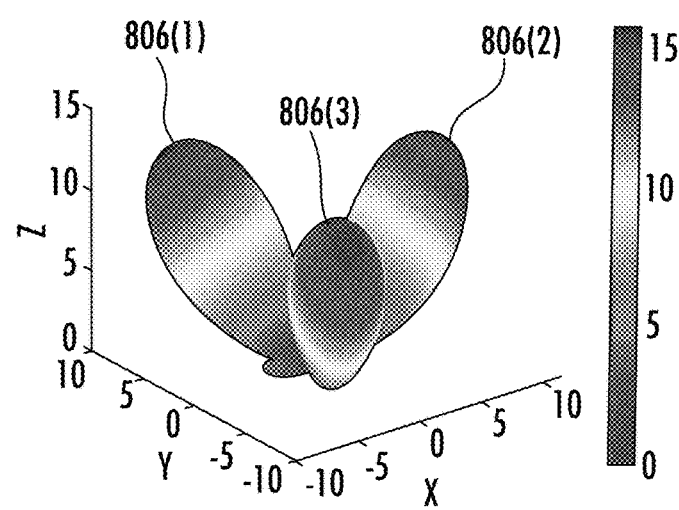
FIG. 8B is a graphic diagram providing an exemplary illustration of a number of sectorized RF beams radiated by the wireless communications apparatus of FIG. 8A.

The wireless communications apparatus 800 may include a second antenna array 802 and a third antenna array 804 (collectively referred to as "at least one second antenna array") in addition to the antenna array 304. In a non-limiting example, the antenna array 304, the second antenna array 802, and the third antenna array 804 are symmetrically located in the wireless communications apparatus 800. For example, the antenna array 304, the second antenna array 802, and the third antenna array 804 can be provided on three endpoints of an equilateral triangle. Notably, since the antenna array 304, the second antenna array 802, and the third antenna array 804 are symmetrically located, the control circuit 312 may use the same center beam weight set $w_c$ and the same edge beam weight sets $w_{e1}$-$w_{eK}$ to cause each of the antenna array 304, the second antenna array 802, and the third antenna array 804 to radiate the center RF beam 604 of FIG. 6B or the multi-peak center RF beam 700 of FIG. 7A and the edge RF beams 606(1)-606(20) of FIG. 6B. As a result, the wireless communications apparatus 800 may be able to simultaneously radiate a plurality of sectorized RF beams 806(1)-806(3), as illustrated in FIG. 8B, to further improve RF coverage in the wireless communications cell 302.

Notably, the antenna array 304, the second antenna array 802, and the third antenna array 804 may be configured to radiate the sectorized RF beams 806(1)-806(3) based on a same set of SSBs. In this regard, it may be possible to further improve RF coverage in the wireless communications cell 302 with a reduced number of SSBs, thus helping to reduce computational complexity, processing delay, and energy consumption of the wireless communications apparatus 800.

Figure 9:
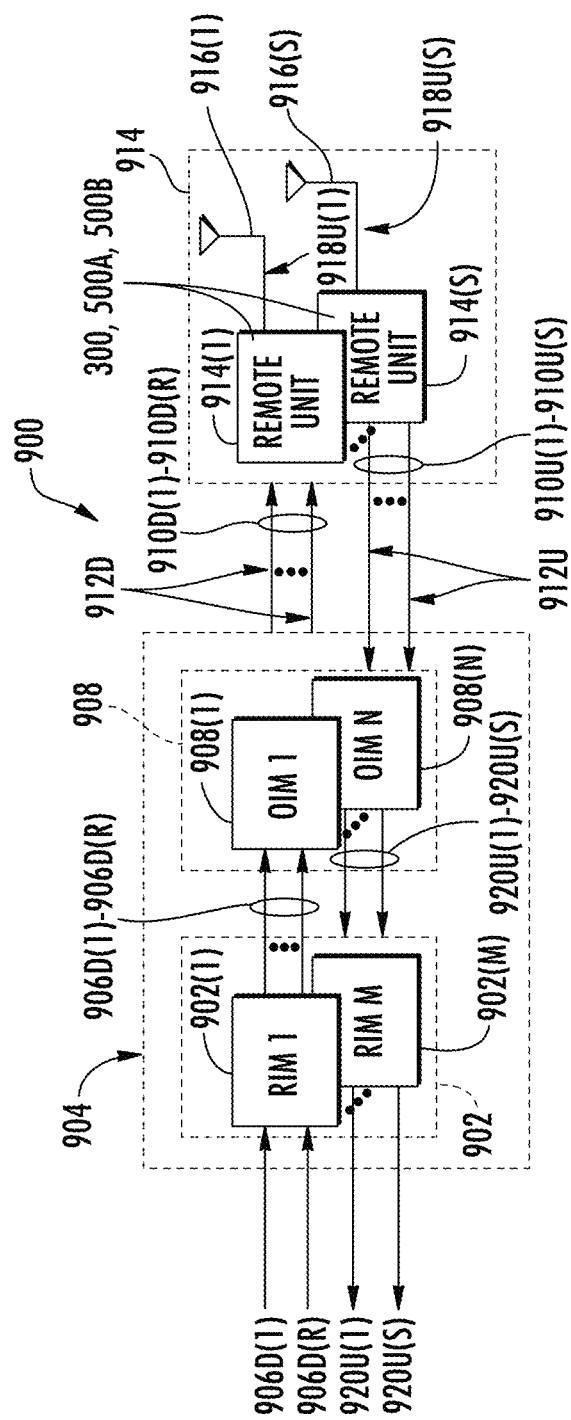
FIG. 9 is a schematic diagram of an exemplary WCS provided in the form of an optical fiber-based DAS that is configured to include the wireless communications apparatus of FIG. 3 to form multi-beamwidth RF beams to optimize RF beamforming to maximize RF coverage in the wireless communications cell.

FIG. 9 is a schematic diagram an exemplary WCS 900 provided in the form of an optical fiber-based WDS that can include a plurality of remote units, such as the wireless communications apparatus 300 of FIG. 3, the wireless communications apparatus 500A of FIG. 5A, and the wireless communications apparatus 500B of FIG. 5B to form multi-beamwidth RF beams to optimize RF beamforming to maximize RF coverage in the wireless communications cell 302. The WCS 900 includes an optical fiber for distributing communications services for multiple frequency bands. The WCS 900 in this example is comprised of three (3) main components. A plurality of radio interfaces provided in the form of radio interface modules (RIMs) 902(1)-902(M) are provided in a central unit 904 to receive and process a plurality of downlink digital communications signals 906D(1)-906D(R) prior to optical conversion into downlink optical fiber-based communications signals. The downlink digital communications signals 906D(1)-906D(R) may be received from a base station or a baseband unit as an example. The RIMs 902(1)-902(M) provide both downlink and uplink interfaces for signal processing. The notations "1-R" and "1-M" indicate that any number of the referenced component, 1-R and 1-M, respectively, may be provided. The central unit 904 is configured to accept the RIMs 902(1)-902(M) as modular components that can easily be installed and removed or replaced in the central unit 904. In one example, the central unit 904 is configured to support up to twelve (12) RIMs 902(1)-902(12). Each of the RIMs 902(1)-902(M) can be designed to support a particular type of radio source or range of radio sources (i.e., frequencies) to provide flexibility in configuring the central unit 904 and the WCS 900 to support the desired radio sources.

For example, one RIM 902 may be configured to support the Personalized Communications System (PCS) radio band. Another RIM 902 may be configured to support the 800 megahertz (MHz) radio band. In this example, by inclusion of the RIMS 902(1)-902(M), the central unit 904 could be configured to support and distribute communications signals on both PCS and Long-Term Evolution (LTE) 700 radio bands, as an example. The RIMs 902(1)-902(M) may be provided in the central unit 904 that support any frequency bands desired, including, but not limited to, the US Cellular band, PCS band, Advanced Wireless Service (AWS) band, 700 MHz band, Global System for Mobile communications (GSM) 900, GSM 1800, and Universal Mobile Telecommunications System (UNITS). The RIMs 902(1)-902(M) may also be provided in the central unit 904 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 902(1)-902(M) may be provided in the central unit 904 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 9, the downlink digital communications signals 906D(1)-906D(R) are provided to a plurality of optical interfaces provided in the form of optical interface modules (OIMs) 908(1)-908(N) in this embodiment to convert the downlink digital communications signals 906D(1)-906D(R) into a plurality of downlink optical fiber-based communications signals 910D(1)-910D(R). The notation "1-N" indicates that any number of the referenced component 1-N may be provided. The OIMs 908(1)-908(N) may be configured to provide a plurality of optical interface components (OICs) that contain optical-to-electrical (O/E) and electrical-to-optical (E/O) converters, as will be described in more detail below. The OIMs 908(1)-908(N) support the radio bands that can be provided by the RIMs 902(1)-902(M), including the examples previously described above.

The OIMs 908(1)-908(N) each include E/O converters to convert the downlink digital communications signals 906D(1)-906D(R) into the downlink optical fiber-based communications signals 910D(1)-910D(R). The downlink optical fiber-based communications signals 910D(1)-910D(R) are communicated over a downlink optical fiber-based communications medium 912D to a plurality of remote units 914(1)-914(S). At least one selected remote unit among the remote units 914(1)-914(S) can be configured to function as the wireless communications apparatus 300 of FIG. 3, the wireless communications apparatus 500A of FIG. 5A, or the wireless communications apparatus 500B of FIG. 5B. The notation "1-S" indicates that any number of the referenced component 1-S may be provided. Remote unit O/E converters provided in the remote units 914(1)-914(S) convert the downlink optical fiber-based communications signals 910D(1)-910D(R) back into the downlink digital communications signals 906D(1)-906D(R), which are the converted into a plurality of downlink RF communications signals and provided to antennas 916(1)-916(S) in the remote units 914(1)-914(S) to client devices in the reception range of the antennas 916(1)-916(S).

The remote units 914(1)-914(S) receive a plurality of uplink RF communications signals from the client devices through the antennas 916(1)-916(S). The remote units 914(1)-914(S) convert the uplink RF communications signals into a plurality of uplink digital communications signals 918U(1)-918U(S). Remote unit E/O converters are also provided in the remote units 914(1)-914(S) to convert the uplink digital communications signals 918U(1)-918U(S) into a plurality of uplink optical fiber-based communications signals 910U(1)-910U(S). The remote units 914(1)-914(S) communicate the uplink optical fiber-based communications signals 910U(1)-910U(S) over an uplink optical fiber-based communications medium 912U to the OIMs 908(1)-908(N) in the central unit 904. The OIMs 908(1)-908(N) include O/E converters that convert the received uplink optical fiber-based communications signals 910U(1)-910U(S) into a plurality of uplink digital communications signals 920U(1)-920U(S), which are processed by the RIMS 902(1)-902(M) and provided as the uplink digital communications signals 920U(1)-920U(S). The central unit 904 may provide the uplink digital communications signals 920U(1)-920U(S) to a base station or other communications system.

Note that the downlink optical fiber-based communications medium 912D and the uplink optical fiber-based communications medium 912U connected to each of the remote units 914(1)-914(S) may be a common optical fiber-based communications medium, wherein for example, wave division multiplexing (WDM) is employed to provide the downlink optical fiber-based communications signals 910D(1)-910D(R) and the uplink optical fiber-based communications signals 910U(1)-910U(S) on the same optical fiber-based communications medium.

Figure 10:
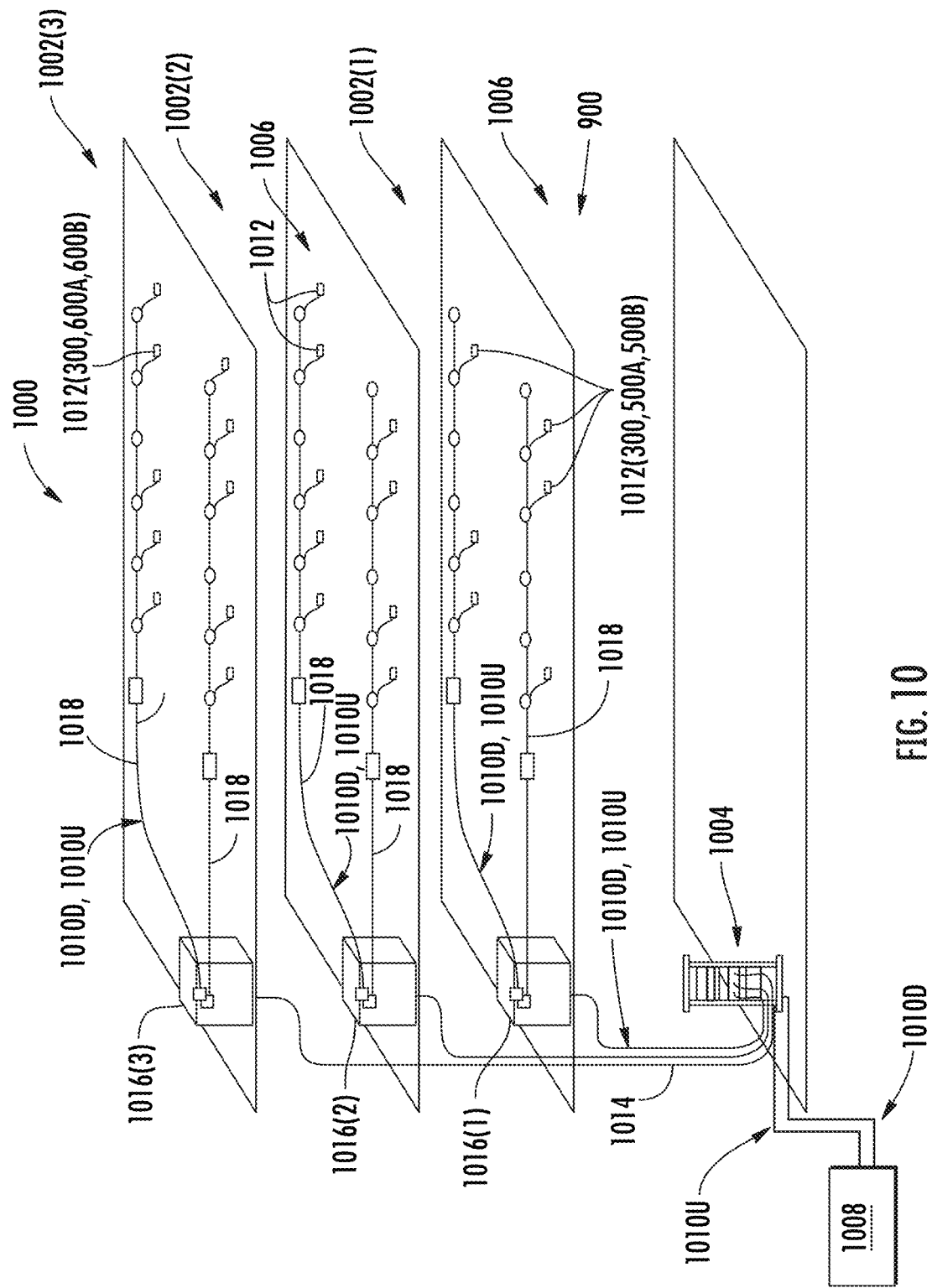
FIG. 10 is a schematic diagram of an exemplary building infrastructure with a deployed DCS, such as the optical fiber-based DAS in FIG. 9.

The WCS 900 in FIG. 9 can be provided in an indoor environment as illustrated in FIG. 10. FIG. 10 is a partial schematic cut-away diagram of an exemplary building infrastructure 1000 incorporating the WCS 900 of FIG. 9. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004 is communicatively coupled to a base station 1008 to receive downlink communications signals 1010D from the base station 1008. The central unit 1004 is communicatively coupled to a plurality of remote units 1012 to distribute the downlink communications signals 1010D to the remote units 1012 and to receive uplink communications signals 1010U from the remote units 1012, as previously discussed above. In a non-limiting example, any of the remote units 1012 can be configured to incorporate the wireless communications apparatus 300 of FIG. 3, the wireless communications apparatus 500A of FIG. 5A, and the wireless communications apparatus 500B of FIG. 5B to optimize RF beamforming to maximize RF coverage in the wireless communications cell 302. The downlink communications signals 1010D and the uplink communications signals 1010U communicated between the central unit 1004 and the remote units 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the remote units 1012 and also provide power to the remote units 1012 via array cables 1018.

Figure 11:
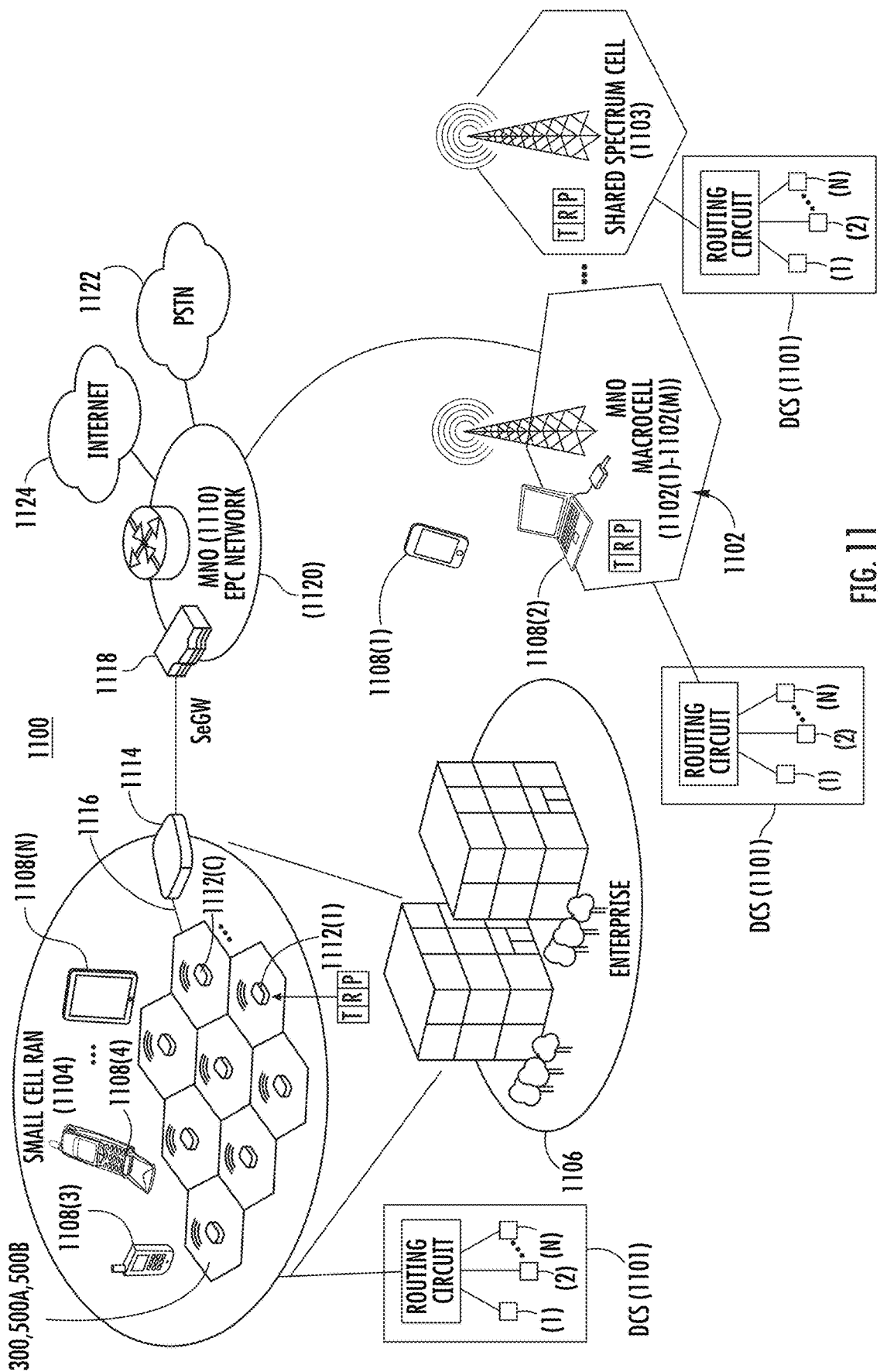
FIG. 11 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment, wherein any of the radio nodes can be configured to incorporate the wireless communications apparatus of FIG. 3 to form multi-beamwidth RF beams to optimize RF beamforming to maximize RF coverage in a wireless communications cell.

The WCS 900 of FIG. 9, which includes the wireless communications apparatus 300 of FIG. 3, the wireless communications apparatus 500A of FIG. 5A, and the wireless communications apparatus 500B of FIG. 5B to form multi-beamwidth RF beams to optimize RF beamforming to maximize RF coverage in the wireless communications cell 302, can also be interfaced with different types of radio nodes of service providers and/or supporting service providers, including macrocell systems, small cell systems, and remote radio heads (RRH) systems, as examples. For example, FIG. 11 is a schematic diagram of an exemplary mobile telecommunications environment 1100 (also referred to as "environment 1100") that includes radio nodes and cells that may support shared spectrum, such as unlicensed spectrum, and can be interfaced to shared spectrum distributed communications systems (DCSs) 1101 supporting coordination of distribution of shared spectrum from multiple service providers to remote units to be distributed to subscriber devices. The shared spectrum DCSs 1101 can include the WCS 900 of FIG. 9 as an example.

The environment 1100 includes exemplary macrocell RANs 1102(1)-1102(M) ("macrocells 1102(1)-1102(M)") and an exemplary small cell RAN 1104 located within an enterprise environment 1106 and configured to service mobile communications between a user mobile communications device 1108(1)-1108(N) to a mobile network operator (MNO) 1110. A serving RAN for a user mobile communications device 1108(1)-1108(N) is a RAN or cell in the RAN in which the user mobile communications devices 1108(1)-1108(N) have an established communications session with the exchange of mobile communications signals for mobile communications. Thus, a serving RAN may also be referred to herein as a serving cell. For example, the user mobile communications devices 1108(3)-1108(N) in FIG. 11 are being serviced by the small cell RAN 1104, whereas user mobile communications devices 1108(1) and 1108(2) are being serviced by the macrocell 1102. The macrocell 1102 is an MNO macrocell in this example. However, a shared spectrum RAN 1103 (also referred to as "shared spectrum cell 1103") includes a macrocell in this example and supports communications on frequencies that are not solely licensed to a particular MNO and thus may service user mobile communications devices 1108(1)-1108(N) independent of a particular MNO. For example, the shared spectrum cell 1103 may be operated by a third party that is not an MNO and wherein the shared spectrum cell 1103 supports CBRS. Also, as shown in FIG. 11, the MNO macrocell 1102, the shared spectrum cell 1103, and/or the small cell RAN 1104 can interface with a shared spectrum DCS 1101 supporting coordination of distribution of shared spectrum from multiple service providers to remote units to be distributed to subscriber devices. The MNO macrocell 1102, the shared spectrum cell 1103, and the small cell RAN 1104 may be neighboring radio access systems to each other, meaning that some or all can be in proximity to each other such that a user mobile communications device 1108(3)-1108(N) may be able to be in communications range of two or more of the MNO macrocell 1102, the shared spectrum cell 1103, and the small cell RAN 1104 depending on the location of user mobile communications devices 1108(3)-1108(N).

In FIG. 11, the mobile telecommunications environment 1100 in this example is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1100 includes the enterprise 1106 in which the small cell RAN 1104 is implemented. The small cell RAN 1104 includes a plurality of small cell radio nodes 1112(1)-1112(C). Each small cell radio node 1112(1)-1112(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated. In a non-limiting example, each of the small cell radio nodes 1112(1)-1112(C) can be configured to incorporate the wireless communications apparatus 300 of FIG. 3, the wireless communications apparatus 500A of FIG. 5A, and the wireless communications apparatus 500B of FIG. 5B to form multi-beamwidth RF beams to optimize RF beamforming to maximize RF coverage in the wireless communications cell 302.

In FIG. 11, the small cell RAN 1104 includes one or more services nodes (represented as a single services node 1114) that manage and control the small cell radio nodes 1112(1)-1112(C). In alternative implementations, the management and control functionality may be incorporated into a radio node, distributed among nodes, or implemented remotely (i.e., using infrastructure external to the small cell RAN 1104). The small cell radio nodes 1112(1)-1112(C) are coupled to the services node 1114 over a direct or local area network (LAN) connection 1116 as an example, typically using secure IPsec tunnels. The small cell radio nodes 1112(1)-1112(C) can include multi-operator radio nodes. The services node 1114 aggregates voice and data traffic from the small cell radio nodes 1112(1)-1112(C) and provides connectivity over an IPsec tunnel to a security gateway (SeGW) 1118 in a network 1120 (e.g., evolved packet core (EPC) network in a 4G network, or 5G Core in a 5G network) of the MNO 1110. The network 1120 is typically configured to communicate with a public switched telephone network (PSTN) 1122 to carry circuit-switched traffic, as well as for communicating with an external packet-switched network such as the Internet 1124.

The environment 1100 also generally includes a node (e.g., eNodeB or gNodeB) base station, or "macrocell" 1102. The radio coverage area of the macrocell 1102 is typically much larger than that of a small cell where the extent of coverage often depends on the base station configuration and surrounding geography. Thus, a given user mobile communications device 1108(3)-1108(N) may achieve connectivity to the network 1120 (e.g., EPC network in a 4G network, or 5G Core in a 5G network) through either a macrocell 1102 or small cell radio node 1112(1)-1112(C) in the small cell RAN 1104 in the environment 1100.

Figure 12:
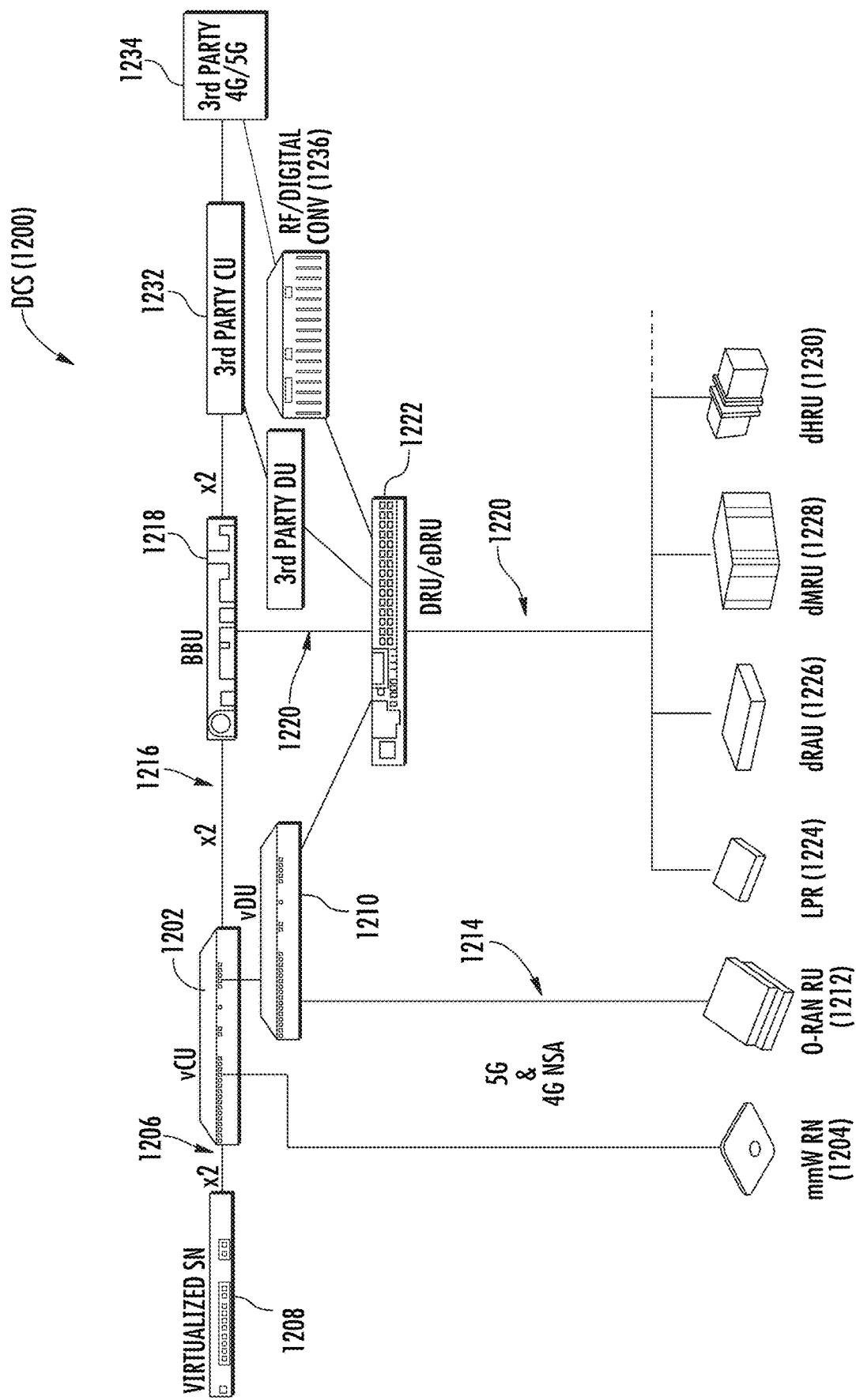
FIG. 12 is a schematic diagram an exemplary distributed communications system that supports 4G and 5G communications services, and wherein any of the radio nodes can be configured to form multi-beamwidth RF beams to optimize RF beamforming to maximize RF coverage in a wireless communications cell.

FIG. 12 is a schematic diagram of another exemplary DCS 1200 that supports 4G and 5G communications services, and wherein any of the radio nodes can be configured to provide feedbackless interference estimation and suppression, according to any of the embodiments herein. The DCS 1200 supports both legacy 4G LTE, 4G/5G non-standalone (NSA), and 5G communications systems. As shown in FIG. 12, a centralized services node 1202 is provided that is configured to interface with a core network to exchange communications data and distribute the communications data as radio signals to remote units. In this example, the centralized services node 1202 is configured to support distributed communications services to a millimeter wave (mmW) radio node 1204. The functions of the centralized services node 1202 can be virtualized through an x2 interface 1206 to another services node 1208. The centralized services node 1202 can also include one or more internal radio nodes that are configured to be interfaced with a distribution node 1210 to distribute communications signals for the radio nodes to an open RAN (O-RAN) remote unit 1212 that is configured to be communicatively coupled through an O-RAN interface 1214.

The centralized services node 1202 can also be interfaced through an x2 interface 1216 to a baseband unit (BBU) 1218 that can provide a digital signal source to the centralized services node 1202. The BBU 1218 is configured to provide a signal source to the centralized services node 1202 to provide radio source signals 1220 to the O-RAN remote unit 1212 as well as to a distributed router unit (DRU) 1222 as part of a digital DAS. The DRU 1222 is configured to split and distribute the radio source signals 1220 to different types of remote units, including a lower power remote unit (LPR) 1224, a radio antenna unit (dRAU) 1226, a mid-power remote unit (dMRU) 1228, and a high power remote unit (dHRU) 1230. The BBU 1218 is also configured to interface with a third party central unit 1232 and/or an analog source 1234 through an RF/digital converter 1236.

Figure 13:
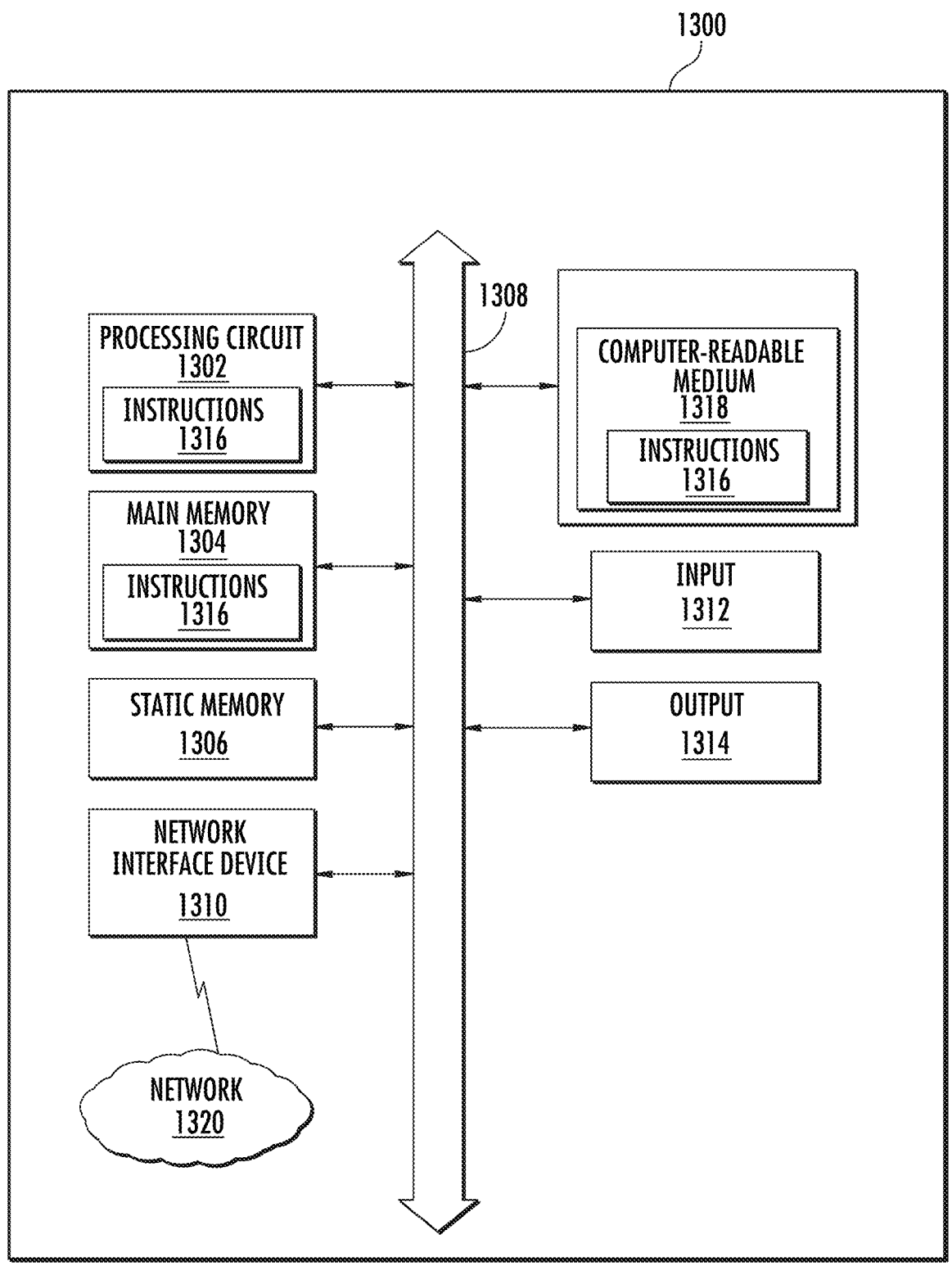
FIG. 13 is a schematic diagram of a representation of an exemplary computer system that can be included in or interface with any of the components in the wireless communications apparatus of FIG. 3, wherein the exemplary computer system is configured to execute instructions from an exemplary computer-readable medium to form multi-beamwidth RF beams to optimize RF beamforming to maximize RF coverage in a wireless communications cell.

Any of the circuits in the wireless communications apparatus 300 of FIG. 3, the wireless communications apparatus 500A of FIG. 5A, and the wireless communications apparatus 500B of FIG. 5B (e.g., the control circuit 312) can include a computer system 1300, such as shown in FIG. 13, to form multi-beamwidth RF beams to optimize RF beamforming to maximize RF coverage in the wireless communications cell 302. With reference to FIG. 13, the computer system 1300 includes a set of instructions for causing the multi-operator radio node component(s) to provide its designed functionality, and their circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1300 in this embodiment includes a processing circuit or processor 1302, a main memory 1304 (e.g., read-only memory (ROM), flash memory, dynamic random access memory (DRAM) such as synchronous DRAM (SDRAM), etc.), and a static memory 1306 (e.g., flash memory, static random access memory (SRAM), etc.), which may communicate with each other via a data bus 1308. Alternatively, the processing circuit 1302 may be connected to the main memory 1304 and/or static memory 1306 directly or via some other connectivity means. The processing circuit 1302 may be a controller, and the main memory 1304 or static memory 1306 may be any type of memory.

The processing circuit 1302 represents one or more general-purpose processing circuits such as a microprocessor, central processing unit, or the like. More particularly, the processing circuit 1302 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1302 is configured to execute processing logic in instructions 1316 for performing the operations and steps discussed herein.

The computer system 1300 may further include a network interface device 1310. The computer system 1300 also may or may not include an input 1312 to receive input and selections to be communicated to the computer system 1300 when executing instructions. The computer system 1300 also may or may not include an output 1314, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1300 may or may not include a data storage device that includes instructions 1316 stored in a computer-readable medium 1318. The instructions 1316 may also reside, completely or at least partially, within the main memory 1304 and/or within the processing circuit 1302 during execution thereof by the computer system 1300, the main memory 1304 and the processing circuit 1302 also constituting computer-readable medium. The instructions 1316 may further be transmitted or received over a network 1320 via the network interface device 1310.

While the computer-readable medium 1318 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless communications apparatus deployed in an infrastructure comprising at least one floor, comprising:
   a signal processing circuit configured to generate a plurality of weighted radio frequency (RF) communications signals;
   at least one antenna array comprising a plurality of radiating elements coupled to the signal processing circuit and each configured to radiate a respective one of the plurality of weighted RF communications signals; and
   a control circuit configured to:
      determine a center beam weight set comprising a plurality of center beam weights each corresponding to a respective one of the plurality of radiating elements;
      control the signal processing circuit to generate the plurality of weighted RF communications signals to cause the at least one antenna array to radiate a center RF beam in a wireless communications cell located on a floor of the infrastructure, the center RF beam comprising the plurality of weighted RF communications signals and is associated with a center beamwidth;
      determine a plurality of edge beam weight sets each comprising a plurality of edge beam weights that each correspond to a respective one of the plurality of radiating elements; and
      control the signal processing circuit to generate the plurality of weighted RF communications signals based on each of the plurality of edge beam weight sets to cause the at least one antenna array to radiate a plurality of edge RF beams in the wireless communications cell, the plurality of edge RF beams each comprising the plurality of weighted RF communications signals and associated with an edge beamwidth narrower than the center beamwidth.

2. The wireless communications apparatus of claim 1, wherein the control circuit is further configured to determine each of the plurality of center beam weights in the center beam weight set based on a first zenith angle and a first azimuth angle.

3. The wireless communication apparatus of claim 2, wherein the control circuit is further configured to control the signal processing circuit to generate the plurality of weighted RF communications signals based on the plurality of center beam weights to radiate the center RF beam.

4. The wireless communications apparatus of claim 3, wherein the control circuit is further configured to zerorize one or more of the plurality of center beam weights in the center beam weight set to cause the at least one antenna array to radiate the center RF beam in the center beamwidth.

5. The wireless communications apparatus of claim 4, wherein the control circuit is further configured to determine each of the plurality of edge beam weight sets based on a second zenith angle different from the first zenith angle and a respective one of a plurality of second azimuth angles.

6. The wireless communications apparatus of claim 5, wherein the control circuit is further configured to control the signal processing circuit to generate the plurality of weighted RF communications signals based on each of the plurality of edge beam weight sets to radiate the plurality of edge RF beams.

7. The wireless communications apparatus of claim 1, wherein the control circuit is further configured to determine the center beam weight set comprising a plurality of center beam weight subsets each corresponding to a respective one of a plurality of radiating element sections in the at least one antenna array, wherein each of the plurality of center beam weight subsets is determined based on a first zenith angle and a respective one of a plurality of first azimuth angles.

8. The wireless communications apparatus of claim 7, wherein the control circuit is further configured to control the signal processing circuit to generate the plurality of weighted RF communications signals based on the center beam weight set to cause the at least one antenna array to radiate the center RF beam comprising a plurality of peaks each corresponding to a respective one of the plurality of center beam weight subsets.

9. The wireless communications apparatus of claim 1, further comprising at least one second antenna array configured to radiate the center RF beam associated with the center beamwidth and comprising the plurality of weighted RF communications signals generated based on the center beam weight set.

10. The wireless communications apparatus of claim 9, wherein the second antenna array is further configured to radiate the plurality of edge RF beams each associated with the edge beamwidth narrower than the center beamwidth and comprising the plurality of weighted RF communications signals generated based on each of the plurality of edge beam weight sets.

11. A method for optimizing radio frequency (RF) beamforming in a wireless communications apparatus deployed in an infrastructure comprising at least one floor, comprising:
   determining a center beam weight set comprising one or more center beam weights;
   generating a plurality of weighted RF communications signals based on the center beam weight set to cause a center RF beam in a wireless communications cell located on a floor of the infrastructure, the center RF beam comprises the plurality of weighted RF communications signals and is associated with a center beamwidth to be radiated;
   determining a plurality of edge beam weight sets each comprising a plurality of edge beam weights; and
   generating the plurality of weighted RF communications signals based on each of the plurality of edge beam weight sets to cause a plurality of edge RF beams in the wireless communications cell, the plurality of edge beam weight sets each comprising the plurality of weighted RF communications signals and associated with an edge beamwidth narrower than the center beamwidth to be radiated.

12. The method of claim 11, further comprising determining each of the plurality of center beam weights in the center beam weight set based on a first zenith angle and a first azimuth angle.

13. The method of claim 12, further comprising generating the plurality of weighted RF communications signals based on the plurality of center beam weights to radiate the center RF beam.

14. The method of claim 13, further comprising zerorizing one or more of the plurality of center beam weights in the center beam weight set to cause the center RF beam to be radiated in the center beamwidth.

15. The method of claim 13, further comprising determining each of the plurality of edge beam weight sets based on a second zenith angle different from the first zenith angle and a respective one of a plurality of second azimuth angles.

16. The method of claim 15, further comprising generating the plurality of weighted RF communications signals based on each of the plurality of edge beam weight sets to radiate the plurality of edge RF beams.

17. The method of claim 11, further comprising determining the center beam weight set comprising a plurality of center beam weight subsets, wherein each of the plurality of center beam weight subsets is determined based on a first zenith angle and a respective one of a plurality of first azimuth angles.

18. The method of claim 17, further comprising generating the plurality of weighted RF communications signals based on the center beam weight set to cause the center RF beam to comprise a plurality of peaks each corresponding to a respective one of the plurality of center beam weight subsets.

\* \* \* \* \*

UNITED STATES PATENT AND TRADEMARK OFFICE
CERTIFICATE OF CORRECTION

PATENT NO. : 11,936,451 B2
APPLICATION NO. : 17/837626
DATED : March 19, 2024
INVENTOR(S) : Shirish Nagaraj et al.

Page 1 of 1

It is certified that error appears in the above-identified patent and that said Letters Patent is hereby corrected as shown below:

In the Claims

In Column 23, Line 43, in Claim 3, delete "communication" and insert -- communications --.

Signed and Sealed this
Twenty-seventh Day of August, 2024

Katherine Kelly Vidal
*Director of the United States Patent and Trademark Office*